(12) United States Patent
Gassend

(10) Patent No.: US 11,300,958 B2
(45) Date of Patent: Apr. 12, 2022

(54) SENSOR ADJUSTMENT BASED ON VEHICLE MOTION

(71) Applicant: Waymo LLC, Mountain View, CA (US)

(72) Inventor: Blaise Gassend, East Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 505 days.

(21) Appl. No.: 15/648,673

(22) Filed: Jul. 13, 2017

(65) Prior Publication Data

US 2019/0018416 A1    Jan. 17, 2019

(51) Int. Cl.

| G01S 7/48 | (2006.01) |
| --- | --- |
| G05D 1/00 | (2006.01) |
| G05D 1/02 | (2020.01) |
| G01S 7/484 | (2006.01) |
| G01S 7/497 | (2006.01) |
| G01S 17/10 | (2020.01) |
| G01S 17/89 | (2020.01) |
| G01S 17/86 | (2020.01) |

(Continued)

(52) U.S. Cl.
CPC .......... G05D 1/0094 (2013.01); G01S 7/484 (2013.01); G01S 7/497 (2013.01); G01S 7/4972 (2013.01); G01S 17/10 (2013.01); G01S 17/86 (2020.01); G01S 17/89 (2013.01); G01S 17/931 (2020.01); G05D 1/0231 (2013.01); G05D 1/0246 (2013.01); B60W 30/09 (2013.01); G05D 2201/0213 (2013.01)

(58) Field of Classification Search
None
See application file for complete search history.

(56) References Cited

U.S. PATENT DOCUMENTS

| 6,529,803 B2 | 3/2003 | Meyers et al. |
| --- | --- | --- |
| 7,064,817 B1 | 6/2006 | Schmitt et al. |
| 7,411,661 B2 | 8/2008 | Kim |
| 7,969,558 B2 * | 6/2011 | Hall ............... G01S 7/4811 356/5.01 |

(Continued)

FOREIGN PATENT DOCUMENTS

| EP | 2565699 A2 | 3/2013 |
| --- | --- | --- |
| KR | 10-2011-0120128 A | 11/2011 |
| KR | 10-2013-0046135 A | 5/2013 |

(Continued)

OTHER PUBLICATIONS

International Search Report and Written Opinion for PCT/US2018/031747 dated Aug. 30, 2018.

(Continued)

*Primary Examiner* — Hovhannes Baghdasaryan
(74) *Attorney, Agent, or Firm* — McDonnell Boehnen Hulbert & Berghoff LLP

(57) ABSTRACT

An example system includes a light detection and ranging (LIDAR) device that scans a field-of-view defined by a pointing direction of the LIDAR device. The system also includes an actuator that adjusts the pointing direction of the LIDAR device. The system also includes one or more sensors that indicate measurements related to motion of a vehicle associated with the LIDAR device. The system also includes a controller that causes the actuator to adjust the pointing direction of the LIDAR device based on at least the motion of the vehicle indicated by the one or more sensors.

15 Claims, 10 Drawing Sheets

(51) Int. Cl.
  *G01S 17/931* (2020.01)
  *B60W 30/09* (2012.01)

(56) References Cited

U.S. PATENT DOCUMENTS

| | | |
|---|---|---|
| 9,322,646 B2 | 4/2016 | Pochiraju et al. |
| 9,383,753 B1 | 7/2016 | Templeton et al. |
| 2009/0262760 A1 | 10/2009 | Krupkin et al. |
| 2010/0053593 A1* | 3/2010 | Bedros ............... G01S 17/931 356/5.01 |
| 2010/0053715 A1 | 3/2010 | O'Neill et al. |
| 2012/0173185 A1 | 7/2012 | Taylor et al. |
| 2013/0289824 A1 | 10/2013 | Mudalige et al. |
| 2016/0001781 A1 | 1/2016 | Fung et al. |
| 2016/0003938 A1 | 1/2016 | Gazit et al. |
| 2016/0292905 A1* | 10/2016 | Nehmadi ............... G01S 17/08 |
| 2017/0010614 A1 | 1/2017 | Shashua et al. |
| 2017/0168146 A1 | 6/2017 | Boehmke |

FOREIGN PATENT DOCUMENTS

| | | |
|---|---|---|
| KR | 20-0469656 Y1 | 10/2013 |
| KR | 10-2015-0047215 A | 5/2015 |
| KR | 10-2016-0078043 A | 7/2016 |
| WO | 2017019725 A1 | 2/2017 |

OTHER PUBLICATIONS

Pierre Merriaux et al., "LiDAR point clouds correction acquired from a moving car based on CAN-bus data," arXiv:1706.05886v1, Jun. 19, 2017.

* cited by examiner

SENSOR ADJUSTMENT BASED ON VEHICLE MOTION

BACKGROUND

A vehicle can include one or more sensors that are configured to detect information about an environment in which the vehicle operates. Passive sensors, such as cameras for instance, are sensors that scan a surrounding environment by passively receiving signals originating from an external source (e.g., the sun, etc.). Active sensors, such as light detection and ranging (LIDAR) sensors, radio detection and ranging (RADAR) sensors, sound navigation and ranging (SONAR) sensors, among others, are sensors that can scan a surrounding environment by emitting signals toward the surrounding environment and detecting reflections of the emitted signals.

For example, a LIDAR sensor can determine distances to environmental features while scanning through a scene to assemble a "point cloud" indicative of reflective surfaces in the environment. Individual points in the point cloud can be determined, for example, by transmitting a laser pulse and detecting a returning pulse, if any, reflected from an object in the environment, and then determining a distance to the object according to a time delay between the transmission of the pulse and the reception of the reflected pulse. As a result, for example, a three-dimensional map of points indicative of locations of reflective features in the environment can be generated.

SUMMARY

In one example, a system includes a light detection and ranging (LIDAR) device that scans a field-of-view defined by a pointing direction of the LIDAR device. The LIDAR device may be configured to mount to a vehicle. The system also includes an actuator that adjusts the pointing direction of the LIDAR device. The system also includes one or more sensors that indicate measurements related to motion of the vehicle relative to an environment of the vehicle. The system also includes a controller that causes the actuator to adjust the pointing direction of the LIDAR device based on at least the motion of the vehicle indicated by the one or more sensors.

In another example, a vehicle includes a light detection and ranging (LIDAR) device that scans a field-of-view defined by a pointing direction of the LIDAR device. The vehicle also includes an actuator that rotates the LIDAR device about an axis to adjust the pointing direction of the LIDAR device. The vehicle also includes one or more sensors that indicate measurements related to motion of the vehicle relative to an environment of the vehicle. The vehicle also includes a controller that causes the actuator to adjust a frequency of the rotation of the LIDAR device based on at least the motion of the vehicle indicated by the one or more sensors.

In yet another example, a method involves scanning a field-of-view defined by a pointing direction of a LIDAR device that mounts to a vehicle. The method also involves receiving sensor data comprising data indicative of motion of the vehicle relative to an environment of the vehicle. The method also involves adjusting the pointing direction of the LIDAR device relative to the environment of the vehicle based on at least the sensor data.

In still another example, a system comprises means for scanning a field-of-view defined by a pointing direction of a light detection and ranging (LIDAR) device that mounts to a vehicle. The system further comprises means for receiving sensor data comprising data indicative of motion of the vehicle relative to an environment of the vehicle. The system further comprises means for adjusting the pointing direction of the LIDAR device based on at least the sensor data.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
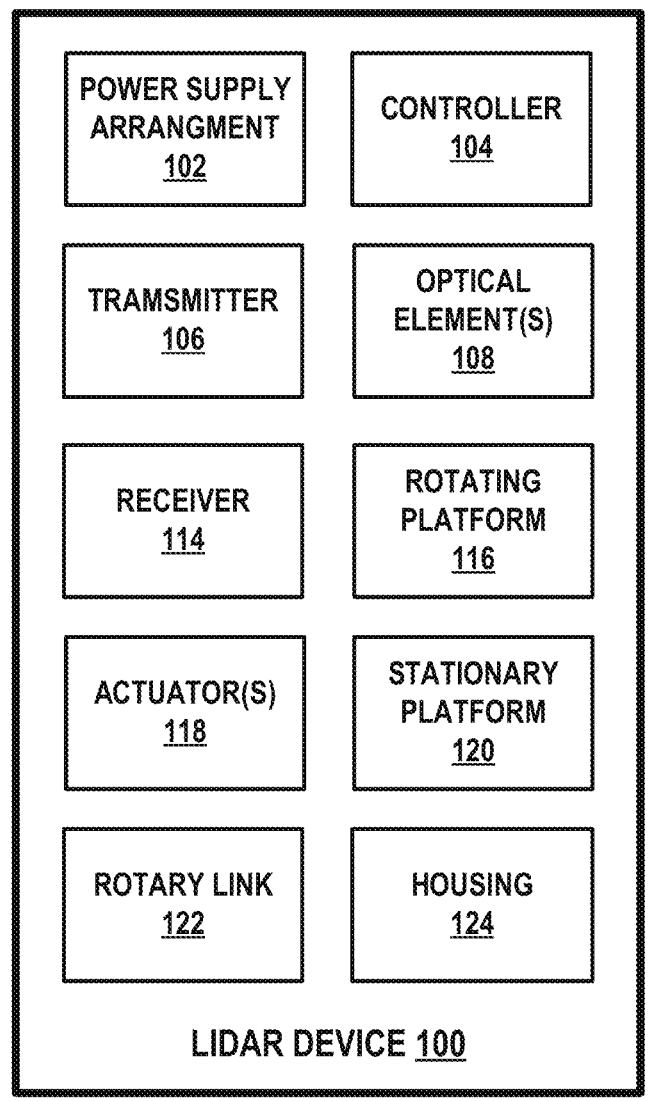
FIG. 1 is a simplified block diagram of a LIDAR device, according to an example embodiment.

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations.

I. OVERVIEW

There are continued efforts to improve vehicle safety and/or autonomous operation, including the development of vehicles equipped with accident-avoidance systems and remote sensing capabilities. To that end, various sensors, such as LIDARs, RADARs, SONARs, cameras, etc., may be included in a vehicle to detect obstacles/objects in an environment of the vehicle and thereby facilitate accident avoidance, autonomous operation, etc.

In some scenarios, motion of a vehicle may affect operations of various sensors mounted to the vehicle. In one example scenario, a LIDAR device mounted to a vehicle may be configured to scan a surrounding environment of the vehicle according to a particular scanning resolution. To facilitate this, for instance, the LIDAR device may emit light pulses at a particular pulse emission rate while rotating at a particular frequency of rotation. In this scenario, if the vehicle performs a turning maneuver (e.g., adjusts a yaw direction of the vehicle relative to the environment), the rotation of the vehicle may cause an adjustment to an apparent frequency of rotation of the LIDAR device relative to the surrounding environment.

For example, if the vehicle in this scenario is turning in a same direction as a direction of rotation of the LIDAR device, a rate of rotation of the LIDAR device relative to a region of the environment scanned during the turning maneuver may be higher than a corresponding rate of rotation when the vehicle is not turning. On the other hand, if the vehicle is turning in an opposite direction to the direction of rotation of the LIDAR device, the rotation rate of the LIDAR device (relative to the region of the environment scanned during the turning maneuver) may be less than a corresponding rate of rotation when the vehicle is not turning. In both cases, the region scanned during the turning maneuver may thus have a different scanning resolution than other scanned regions of the environment. In some instances, this variation in scanning resolution may affect one or more operations of the vehicle (e.g., autonomous navigation, object detection, object identification, etc.) that utilize sensor data from the LIDAR device. Other scenarios are possible as well.

Accordingly, example implementations herein may relate to adjustment of various vehicle-mounted sensor operations based on motion of a vehicle in which the sensor is mounted. One example implementation involves a vehicle that includes a LIDAR device and one or more sensors (e.g., inertial measurement units, gyroscopes, accelerometers, yaw sensors, pitch sensors, roll sensors, speedometers, speed sensors, satellite navigation sensors, etc.) that measure or otherwise indicate motion of the vehicle relative to an environment of the vehicle. The vehicle may also include an actuator configured to adjust a pointing direction of the LIDAR device based on the motion of the vehicle indicated by the one or more sensors.

To that end, in some examples, the one or more sensors (e.g., IMU, gyroscope, accelerometer, compass, etc.) may provide an indication of an orientation of the vehicle relative to the environment. For instance, one example sensor (e.g., yaw sensor) may indicate a measurement of a yaw direction (e.g., direction of travel of a car on a road, etc.) of the vehicle in the environment. Similarly, in some examples, the one or more sensors may include sensors (e.g., IMU, gyroscope, encoder, etc.) that provide an indication of an orientation of the LIDAR device relative to the vehicle. Further, in some examples, the LIDAR device may be configured to rotate about an axis (e.g., LIDAR mounted on top side of the vehicle that rotates to scan the surrounding environment). In these examples, the vehicle can modulate a frequency of rotation of the LIDAR device to account for vehicle motion.

By way of example, consider a scenario where the LIDAR device is rotating in a clockwise direction at a frequency of 15 Hz (15 revolutions per second). In this scenario, if the vehicle performs a right turn maneuver, the vehicle may reduce the frequency of rotation of the LIDAR device by an amount based on the rate of change to the yaw direction of the vehicle (e.g., to a frequency less than 15 Hz). Through this process, the vehicle can mitigate or prevent variations in the apparent frequency of rotation of the LIDAR device relative to the environment before, during, and/or after a driving maneuver (e.g., left turn or right turn). As a result, for instance, the region of the environment scanned by the LIDAR device during the maneuver may have a same or similar scanning resolution as other scanned regions.

Other example vehicle/sensor configurations and operations are possible as well, in accordance with the present disclosure.

II. EXAMPLE SENSORS

Although example sensors described herein include LIDAR sensors, other types of sensors are possible as well. A non-exhaustive list of example sensors that can be employed herein includes RADAR sensors and SONAR sensors, among others. To that end, some example sensors herein may include an active sensor that emits a signal (e.g., in the form of a sequence of pulses, etc.) based on modulated power provided to the sensor, and then detects reflections of the emitted signal from objects in the surrounding environment. Alternatively or additionally, some example sensors herein may include passive sensors, such as cameras and microphones for instance, that detect signals originating from one or more external light sources (e.g., sun, street lamp, etc.) in the surrounding environment.

FIG. 1 is a simplified block diagram of a LIDAR device 100, according to an example embodiment. As shown, LIDAR device 100 includes a power supply arrangement 102, a controller 104, a transmitter 106, one or more optical elements 108, a receiver 114, a rotating platform 116, one or more actuators 118, a stationary platform 120, a rotary link 122, and a housing 124. In other embodiments, LIDAR device 100 may include more, fewer, or different components. For example, device 100 can optionally include one or more sensors (e.g., gyroscopes, accelerometers, encoders, etc.) that indicate a measurement of an orientation of the device 100. Additionally, the components shown may be combined or divided in any number of ways.

Power supply arrangement 102 may be configured to supply, receive, and/or distribute power to various components of LIDAR device 100. To that end, power supply arrangement 102 may include or otherwise take the form of a power source (e.g., battery cells, etc.) disposed within LIDAR device 100 and connected to various components of the LIDAR device 100 in any feasible manner, so as to supply power to those components. Additionally or alternatively, power supply arrangement 102 may include or otherwise take the form of a power adapter configured to receive power from one or more external power sources (e.g., from a power source arranged in a vehicle to which LIDAR device 100 is mounted) and to transmit the received power to various components of LIDAR device 100.

Controller 104 may include one or more electronic components and/or systems arranged to facilitate certain operations of LIDAR device 100. Controller 104 may be disposed within LIDAR device 100 in any feasible manner. In one embodiment, controller 104 may be disposed, at least partially, within a central cavity region of rotary link 122.

In some examples, controller 104 may include or otherwise be coupled to wiring used for transfer of control signals to various components of LIDAR device 100 and/or for transfer of data from various components of LIDAR device 100 to controller 104. Generally, the data that controller 104 receives may include sensor data based on detections of light by receiver 114, among other possibilities. Moreover, the control signals sent by controller 104 may operate various components of LIDAR device 100, such as by controlling emission of light by transmitter 106, controlling detection of light by the receiver 114, and/or controlling actuator(s) 118 to rotate rotating platform 116, among other possibilities.

To that end, in some examples, controller 104 may include one or more processors, data storage, and program instructions (stored on the data storage) executable by the one or more processors to cause LIDAR device 100 to perform the various operations described herein. In some instances, the controller may communicate with an external controller or the like (e.g., a computing system arranged in a vehicle to which LIDAR device 100 is mounted) so as to help facilitate transfer of control signals and/or data between the external controller and the various components of LIDAR device 100.

Additionally or alternatively, in some examples, controller 104 may include circuitry wired to perform the various functions described herein. Additionally or alternatively, in some examples, controller 104 may include one or more special purpose processors, servos, or other types of controllers. For example, controller 104 may include a proportional-integral-derivative (PID) controller or other control loop feedback mechanism that operates actuator(s) 118 to cause the rotating platform to rotate at a particular frequency or phase. Other examples are possible as well.

Transmitter 106 may be configured to transmit light (or other signal) toward an environment of LIDAR device 100. In one example, transmitter 106 may include one or more light sources that emit one or more light beams and/or pulses having wavelengths within a wavelength range. The wavelength range could, for example, be in the ultraviolet, visible, and/or infrared portions of the electromagnetic spectrum. In some examples, the wavelength range can be a narrow wavelength range, such as provided by lasers.

In some examples, the light source(s) in transmitter 106 may include laser diodes, diode bars, light emitting diodes (LED), vertical cavity surface emitting lasers (VCSEL), organic light emitting diodes (OLED), polymer light emitting diodes (PLED), light emitting polymers (LEP), liquid crystal di splays (LCD), microelectromechanical systems (MEMS), fiber lasers, and/or any other device configured to selectively transmit, reflect, and/or emit light to provide a plurality of emitted light beams and/or pulses.

Optical element(s) 108 can be included in or otherwise coupled to transmitter 106 and/or receiver 114. In one example, optical element(s) 108 can be arranged to direct light from a light source in transmitter 106 toward the environment. In another example, optical element(s) 108 can be arranged to focus light from the environment toward receiver 114. As such, optical element(s) 108 may include any feasible combination of mirror(s) used to guide propagation of light through physical space and/or lens(es) used to adjust certain characteristics of the light, among other optical components.

Receiver 114 may include one or more light detectors (e.g., photodiodes, avalanche photodiodes, etc.) that are arranged to intercept and detect reflections of the light pulses emitted by transmitter 106 and reflected from one or more objects in a surrounding environment of LIDAR device 100. To that end, receiver 114 may be configured to detect light having wavelengths in the same wavelength range as the light emitted by transmitter 106. In this way, for instance, LIDAR device 100 may distinguish reflected light pulses originated by LIDAR device 100 from other light in the environment.

In some examples, LIDAR device 100 can select or adjust a horizontal scanning resolution by changing a rate of rotation of LIDAR device 100 and/or adjusting a pulse rate of light pulses emitted by transmitter 106. As a specific example, transmitter 106 can be configured to emit light pulses at a pulse rate of 150,000 light pulses per second. In this example, LIDAR device 100 may be configured to rotate at 15 Hz (i.e., 15 complete 360° rotations per second). As such, receiver 114 can detect light with a 0.036° horizontal angular resolution. The horizontal angular resolution of 0.036° can be adjusted by changing the rate of rotation of LIDAR device 100 or by adjusting the pulse rate. For instance, if LIDAR device 100 is instead rotated at 30 Hz, the horizontal angular resolution may become 0.072°. Alternatively, if transmitter 106 emits the light pulses at a rate of 300,000 light pulses per second while maintaining the rate of rotation of 15 Hz, then the horizontal angular resolution may become 0.018°. In other examples, LIDAR device 100 can be alternatively configured to scan a particular range of views within less than a complete 360° rotation of LIDAR 100.

In some implementations, optical elements 108 may also include at least one mirror arranged to fold the optical path between an optical lens and a photodetector (or light detector) in receiver 114. Each such mirror may be fixed within receiver 114 in any feasible manner. Also, any feasible number of mirrors may be arranged for purposes of folding the optical path. For instance, receiver 114 may also include two or more mirrors arranged to fold the optical path two or more times between the optical lens and the light detector array.

Furthermore, as noted above, receiver 114 may include a photodetector array, which may include one or more detectors each configured to convert detected light (e.g., in the above-mentioned wavelength range) into an electrical signal indicative of the detected light. In practice, such a photodetector array could be arranged in one of various ways. For example, the detectors can be disposed on one or more substrates (e.g., printed circuit boards (PCBs), flexible PCBs, etc.) and arranged to detect incoming light that is traveling along the optical path from the optical lens. Also, such a photodetector array could include any feasible number of detectors aligned in any feasible manner.

Additionally, the detectors in the array may take various forms. For example, the detectors may take the form of photodiodes, avalanche photodiodes (e.g., Geiger mode and/or linear mode avalanche photodiodes), silicon photomultipliers (SiPMs), phototransistors, cameras, active pixel sensors (APS), charge coupled devices (CCD), cryogenic detectors, and/or any other sensor of light configured to receive focused light having wavelengths in the wavelength range of the emitted light.

Rotating platform 116 may be configured to rotate about an axis. To that end, rotating platform 116 can be formed from any solid material suitable for supporting one or more components mounted thereon. For example, transmitter 106 and receiver 114 may be arranged on rotating platform 116 such that each of these components moves relative to the environment based on rotation of rotating platform 116. In particular, each of these components could be rotated relative to an axis so that LIDAR device 100 may obtain information from various directions. In this manner, a pointing direction of LIDAR device 100 can be adjusted horizontally by actuating the rotating platform 114 to different directions.

In order to rotate platform 116 in this manner, one or more actuators 118 may actuate the rotating platform 114. To that end, actuators 118 may include motors, pneumatic actuators, hydraulic pistons, and/or piezoelectric actuators, among other possibilities.

With this arrangement, controller 104 could operate actuator 118 to rotate rotating platform 116 in various ways so as to obtain information about the environment. In one example, rotating platform 116 could be rotated in either direction. In another example, rotating platform 116 may carry out complete revolutions such that LIDAR device 100 provides a 360° horizontal FOV of the environment. Moreover, rotating platform 116 could rotate at various frequencies so as to cause LIDAR device 100 to scan the environment at various refresh rates. In one embodiment, LIDAR device 100 may be configured to have a refresh rate of 15 Hz (e.g., fifteen complete rotations of the LIDAR device 100 per second).

Stationary platform 120 may take on any shape or form and may be configured for coupling to various structures, such as to a top of a vehicle for example. Also, the coupling of the stationary platform may be carried out via any feasible connector arrangement (e.g., bolts and/or screws). In this way, LIDAR device 100 could be coupled to a structure so as to be used for various purposes, such as those described herein.

Rotary link 122 directly or indirectly couples stationary platform 120 to rotating platform 116. To that end, rotary link 122 may take on any shape, form and material that provides for rotation of rotating platform 116 about an axis relative to the stationary platform 120. For instance, rotary link 122 may take the form of a shaft or the like that rotates based on actuation from actuator 118, thereby transferring mechanical forces from actuator 118 to rotating platform 116. In one implementation, rotary link 122 may have a central cavity in which one or more components of LIDAR device 100 may be disposed. In some examples, rotary link 122 may also provide a communication link for transferring data and/or instructions between stationary platform 120 and rotating platform 116 (and/or components thereon such as transmitter 106 and receiver 114).

Housing 124 may take on any shape, form, and material and may be configured to house one or more components of LIDAR device 100. For example, housing 124 can be a dome-shaped housing. Further, for example, housing 124 may be composed of a material that is at least partially non-transparent, which may allow for blocking of at least some light from entering the interior space of the housing 124 and thus help mitigate thermal and noise effects of ambient light on one or more components of LIDAR device 100. Other configurations of housing 124 are possible as well.

In some examples, housing 124 may be coupled to rotating platform 116 such that housing 122 is configured to rotate about the above-mentioned axis based on rotation of rotating platform 116. With this implementation, transmitter 106, receiver 114, and possibly other components of LIDAR device 100 may each be disposed within housing 124. In this manner, transmitter 106 and receiver 114 may rotate along with housing 124 while being disposed within housing 124. It is noted that this arrangement of LIDAR device 100 is described for exemplary purposes only and is not meant to be limiting.

Figure 2:
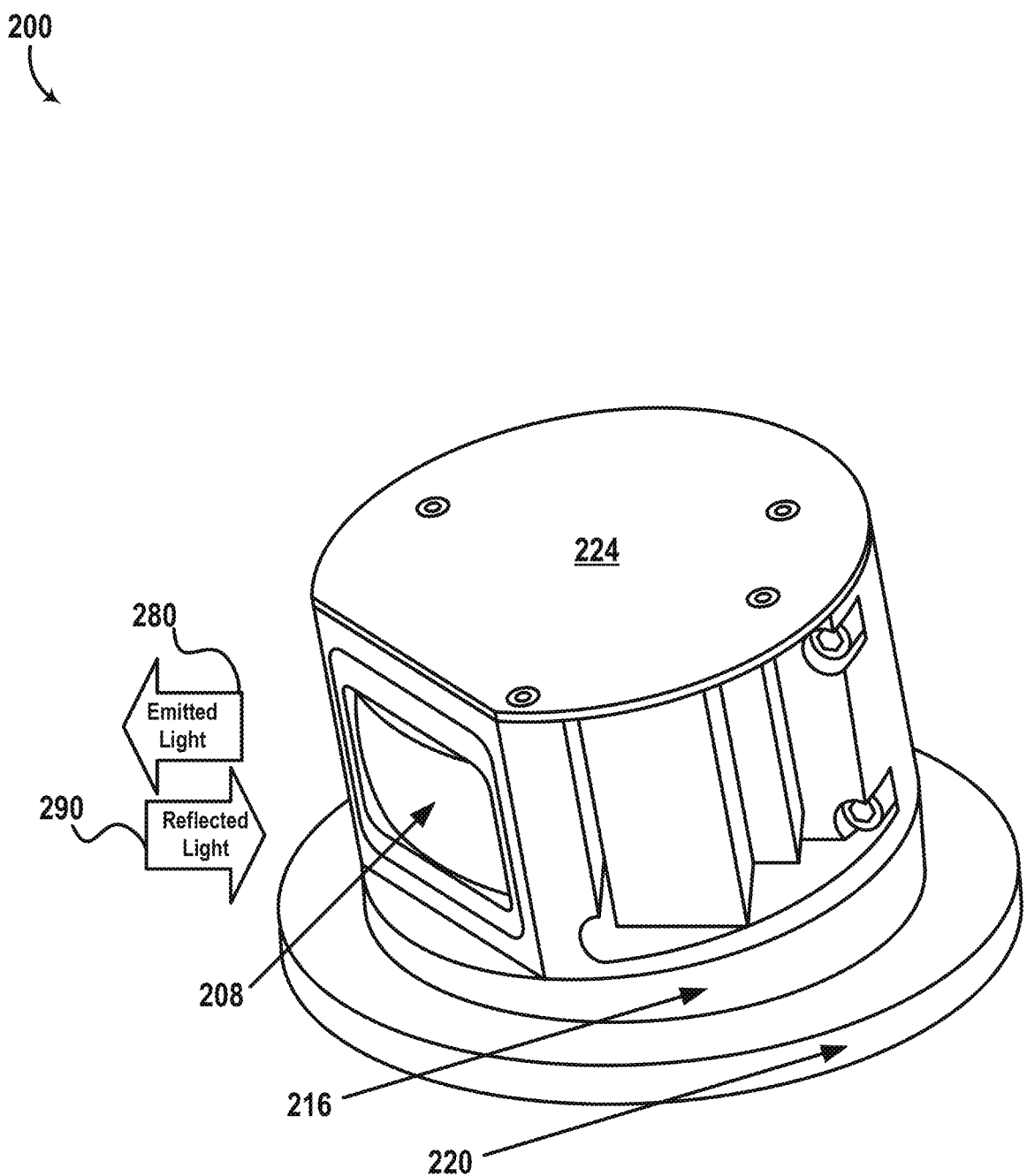
FIG. 2 illustrates a LIDAR device, according to an example embodiment.

FIG. 2 illustrates a LIDAR device 200, according to an example embodiment. LIDAR 200 may be similar to LIDAR 100. For example, as shown, LIDAR 200 includes a lens 208, a rotating platform 216, a stationary platform 220, and a housing 224 which may be similar, respectively, to optical element 108, rotating platform 216, stationary platform 120, and housing 124. As shown, light beams 280 emitted by LIDAR device 200 propagate from lens 108 along a pointing direction of LIDAR 200 toward an environment of LIDAR 200, and reflect off one or more objects in the environment as reflected light 290.

In some examples, housing 224 can be configured to have a substantially cylindrical shape and to rotate about an axis of LIDAR device 200. In one example, housing 224 can have a diameter of approximately 10 centimeters. Other examples are possible. In some examples, the axis of rotation of LIDAR device 200 is substantially vertical. For instance, by rotating housing 224 that includes the various components a three-dimensional map of a 360-degree view of the environment of LIDAR device 200 can be determined. Additionally or alternatively, in some examples, LIDAR device 200 can be configured to tilt the axis of rotation of housing 224 to control a field of view of LIDAR device 200. Thus, in some examples, rotating platform 216 may comprise a movable platform that may tilt in one or more directions to change the axis of rotation of LIDAR device 200.

In some examples, lens 208 can have an optical power to both collimate emitted light beams 280 toward an environment of LIDAR 200 and focus light 290 received from the environment of LIDAR 200. In one example, lens 208 has a focal length of approximately 120 mm. Other example focal lengths are possible. By using the same lens 208 to perform both of these functions, instead of a transmit lens for collimating and a receive lens for focusing, advantages with respect to size, cost, and/or complexity can be provided. Alternatively, LIDAR 200 may include separate transmit and receive lenses.

III. EXAMPLE VEHICLES

Illustrative embodiments herein may include a sensor, such as LIDAR devices 100 and 200 or another type of sensor (e.g., RADAR, SONAR, etc.) for instance, mounted to a vehicle. However, an example sensor can be incorporated on or otherwise connected to any feasible system or arrangement. For instance, an example LIDAR can be used in an assembly line setting (e.g., mounted on a moving platform, etc.) to monitor objects (e.g., products) being manufactured in the assembly line. Other examples are possible as well. Further, for instance, an example LIDAR may additionally or alternatively be used on any type of vehicle, including conventional automobiles as well as automobiles having an autonomous or semi-autonomous mode of operation. Thus, the term "vehicle" is to be broadly construed to cover any moving object, including, for instance, a truck, a van, a semi-trailer truck, a motorcycle, a golf cart, an off-road vehicle, a warehouse transport vehicle, or a farm vehicle, as well as a carrier that rides on a track such as a rollercoaster, trolley, tram, or train car, among others.

Figure 3:
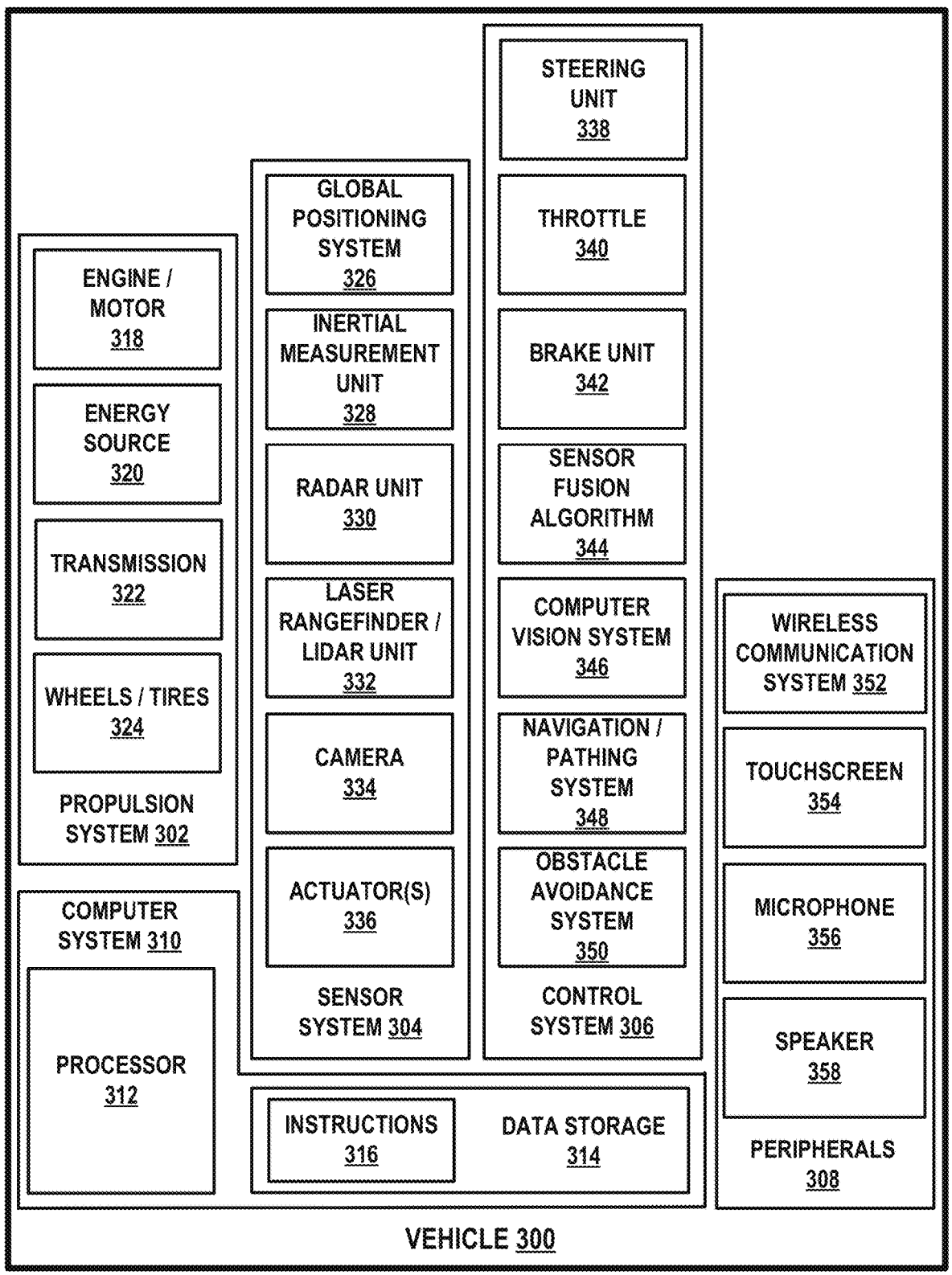
FIG. 3 is a simplified block diagram of a vehicle, according to an example embodiment.

FIG. 3 is a simplified block diagram of a vehicle 300, according to an example embodiment. As shown, the vehicle 300 includes a propulsion system 302, a sensor system 304, a control system 306, peripherals 308, and a computer system 310. In some embodiments, vehicle 300 may include more, fewer, or different systems, and each system may include more, fewer, or different components. Additionally, the systems and components shown may be combined or divided in any number of ways. For instance, control system 306 and computer system 310 may be combined into a single system.

Propulsion system 302 may be configured to provide powered motion for the vehicle 300. To that end, as shown, propulsion system 302 includes an engine/motor 318, an energy source 320, a transmission 322, and wheels/tires 324.

The engine/motor 318 may be or include any combination of an internal combustion engine, an electric motor, a steam engine, and a Sterling engine. Other motors and engines are possible as well. In some embodiments, propulsion system 302 may include multiple types of engines and/or motors. For instance, a gas-electric hybrid car may include a gasoline engine and an electric motor. Other examples are possible.

Energy source 320 may be a source of energy that powers the engine/motor 318 in full or in part. That is, engine/motor 318 may be configured to convert energy source 320 into mechanical energy. Examples of energy sources 320 include gasoline, diesel, propane, other compressed gas-based fuels, ethanol, solar panels, batteries, and other sources of electrical power. Energy source(s) 320 may additionally or alternatively include any combination of fuel tanks, batteries, capacitors, and/or flywheels. In some embodiments, energy source 320 may provide energy for other systems of the vehicle 300 as well. To that end, energy source 320 may additionally or alternatively include, for example, a rechargeable lithium-ion or lead-acid battery. In one example, energy source 320 may include one or more banks of batteries that provide electrical power to various components of vehicle 300.

Transmission 322 may be configured to transmit mechanical power from the engine/motor 318 to the wheels/tires 324. To that end, transmission 322 may include a gearbox, clutch, differential, drive shafts, and/or other elements. In embodiments where the transmission 322 includes drive shafts, the drive shafts may include one or more axles that are configured to be coupled to the wheels/tires 324.

Wheels/tires 324 of vehicle 300 may be configured in various formats, including a unicycle, bicycle/motorcycle, tricycle, or car/truck four-wheel format. Other wheel/tire formats are possible as well, such as those including six or more wheels. In any case, wheels/tires 324 may be configured to rotate differentially with respect to other wheels/tires 324. In some embodiments, wheels/tires 324 may include at least one wheel that is fixedly attached to the transmission 322 and at least one tire coupled to a rim of the wheel that could make contact with the driving surface. Wheels/tires 324 may include any combination of metal and rubber, or combination of other materials. Propulsion system 302 may additionally or alternatively include components other than those shown.

Sensor system 304 may include a number of sensors configured to sense information about an environment in which the vehicle 300 is located, as well as one or more actuators 336 configured to modify a position and/or orientation of the sensors. As shown, sensor system 304 includes a Global Positioning System (GPS) 326, an inertial measurement unit (IMU) 328, a RADAR unit 330, a laser rangefinder and/or LIDAR unit 332, and a camera 334. Sensor system 304 may include additional sensors as well, including, for example, sensors that monitor internal systems of the vehicle 300 (e.g., an $O_2$ monitor, a fuel gauge, an engine oil temperature, etc.). Other sensors are possible as well.

GPS 326 may be any sensor (e.g., location sensor) configured to estimate a geographic location of vehicle 300. To this end, the GPS 326 may include a transceiver configured to estimate a position of vehicle 300 with respect to the Earth.

IMU 328 may be any combination of sensors configured to sense position and orientation changes of the vehicle 300. In some embodiments, the combination of sensors may include, accelerometers, gyroscopes, compasses, among others.

RADAR unit 330 may be any sensor configured to sense objects in the environment in which the vehicle 300 is located using radio signals. In some embodiments, in addition to sensing the objects, RADAR unit 330 may additionally be configured to sense the speed and/or heading of the objects.

Similarly, laser range finder or LIDAR unit 332 may be any sensor configured to sense objects in the environment in which vehicle 300 is located using lasers. For example, LIDAR unit 332 may include one or more LIDAR devices, at least some of which may take the form of LIDAR devices 100 and/or 200 for instance.

Camera 334 may be any camera (e.g., a still camera, a video camera, etc.) configured to capture images of the environment in which the vehicle 300 is located. To that end, camera 334 may take any of the forms described above.

Control system 306 may be configured to control one or more operations of vehicle 300 and/or components thereof. To that end, control system 306 may include a steering unit 338, a throttle 340, a brake unit 342, a sensor fusion algorithm 344, a computer vision system 346, navigation or pathing system 348, and an obstacle avoidance system 350.

Steering unit 338 may be any combination of mechanisms configured to adjust the heading of vehicle 300. Throttle 340 may be any combination of mechanisms configured to control engine/motor 318 and, in turn, the speed of vehicle 300. Brake unit 342 may be any combination of mechanisms configured to decelerate vehicle 300. For example, brake unit 342 may use friction to slow wheels/tires 324. As another example, brake unit 342 may convert kinetic energy of wheels/tires 324 to an electric current.

Sensor fusion algorithm 344 may be an algorithm (or a computer program product storing an algorithm) configured to accept data from sensor system 304 as an input. The data may include, for example, data representing information sensed by sensor system 304. Sensor fusion algorithm 344 may include, for example, a Kalman filter, a Bayesian network, an algorithm for some of the functions of the methods herein, or any another algorithm. Sensor fusion algorithm 344 may further be configured to provide various assessments based on the data from sensor system 304, including, for example, evaluations of individual objects and/or features in the environment in which vehicle 300 is located, evaluations of particular situations, and/or evaluations of possible impacts based on particular situations. Other assessments are possible as well.

Computer vision system 346 may be any system configured to process and analyze images captured by camera 334 in order to identify objects and/or features in the environment in which vehicle 300 is located, including, for example, traffic signals and obstacles. To that end, computer vision system 346 may use an object recognition algorithm, a Structure from Motion (SFM) algorithm, video tracking, or other computer vision techniques. In some embodiments, computer vision system 346 may additionally be configured to map the environment, track objects, estimate the speed of objects, etc.

Navigation and pathing system 348 may be any system configured to determine a driving path for vehicle 300. Navigation and pathing system 348 may additionally be configured to update a driving path of vehicle 300 dynamically while vehicle 300 is in operation. In some embodiments, navigation and pathing system 348 may be configured to incorporate data from sensor fusion algorithm 344, GPS 326, LIDAR unit 332, and/or one or more predetermined maps so as to determine a driving path for vehicle 300.

Obstacle avoidance system 350 may be any system configured to identify, evaluate, and avoid or otherwise negotiate obstacles in the environment of vehicle 300. Control system 306 may additionally or alternatively include other components.

Peripherals 308 may be configured to allow vehicle 300 to interact with external sensors, other vehicles, external computing devices, and/or a user. To that end, peripherals 308 may include, for example, a wireless communication system 352, a touchscreen 354, a microphone 356, and/or a speaker 358.

Wireless communication system 352 may be any system configured to wirelessly couple to one or more other vehicles, sensors, or other entities, either directly or via a communication network. To that end, wireless communication system 352 may include an antenna and a chipset for communicating with the other vehicles, sensors, servers, or other entities either directly or via a communication network. The chipset or wireless communication system 352 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities.

Touchscreen 354 may be used by a user to input commands to vehicle 300. To that end, touchscreen 354 may be configured to sense at least one of a position and a movement of a user's finger via capacitive sensing, resistance sensing, or a surface acoustic wave process, among other possibilities. Touchscreen 354 may be capable of sensing finger movement in a direction parallel or planar to the touchscreen surface, in a direction normal to the touchscreen surface, or both, and may also be capable of sensing a level of pressure applied to the touchscreen surface. Touchscreen 354 may be formed of one or more translucent or transparent insulating layers and one or more translucent or transparent conducting layers. Touchscreen 354 may take other forms as well.

Microphone 356 may be configured to receive audio (e.g., a voice command or other audio input) from a user of vehicle 300. Similarly, speakers 358 may be configured to output audio to the user of vehicle 300.

Computer system 310 may be configured to transmit data to, receive data from, interact with, and/or control one or more of propulsion system 302, sensor system 304, control system 306, and peripherals 308. To this end, computer system 310 may be communicatively linked to one or more of propulsion system 302, sensor system 304, control system 306, and peripherals 308 by a system bus, network, and/or other connection mechanism (not shown).

In one example, computer system 310 may be configured to control operation of transmission 322 to improve fuel efficiency. As another example, computer system 310 may be configured to cause camera 334 to capture images of the environment. As yet another example, computer system 310 may be configured to store and execute instructions corresponding to sensor fusion algorithm 344. As still another example, computer system 310 may be configured to store and execute instructions for determining a 3D representation of the environment around vehicle 300 using LIDAR unit 332. Thus, for instance, computer system 310 could function as a controller for LIDAR unit 332. Other examples are possible as well.

As shown, computer system 310 includes processor 312 and data storage 314. Processor 312 may comprise one or more general-purpose processors and/or one or more special-purpose processors. To the extent that processor 312 includes more than one processor, such processors could work separately or in combination.

Data storage 314, in turn, may comprise one or more volatile and/or one or more non-volatile storage components, such as optical, magnetic, and/or organic storage, and data storage 314 may be integrated in whole or in part with processor 312. In some embodiments, data storage 314 may contain instructions 316 (e.g., program logic) executable by processor 312 to cause vehicle 300 and/or components thereof (e.g., LIDAR unit 332, etc.) to perform the various operations described herein. Data storage 314 may contain additional instructions, including instructions to transmit data to, receive data from, interact with, and/or control systems 302, 304, 306, and/or peripherals 308.

In some embodiments, vehicle 300 may include one or more elements in addition to or instead of those shown. For example, vehicle 300 may include one or more additional interfaces and/or power supplies. Other additional components are possible as well. In such embodiments, data storage 314 may also include instructions executable by processor 312 to control and/or communicate with the additional components. Still further, while each of the components and systems are shown to be integrated in vehicle 300, in some embodiments, one or more components or systems may be removably mounted on or otherwise connected (mechanically or electrically) to vehicle 300 using wired or wireless connections. Vehicle 300 may take other forms as well.

FIGS. 4A-4D collectively illustrate a vehicle 400 equipped with a LIDAR device 410, according to example embodiments. Vehicle 400 may be similar to vehicle 300, for example. Although vehicle 400 is illustrated as a car, as noted above, other types of vehicles are possible. Furthermore, although vehicle 400 may be configured to operate in autonomous mode, the embodiments described herein are also applicable to vehicles that are not configured to operate autonomously.

Figure 4A:
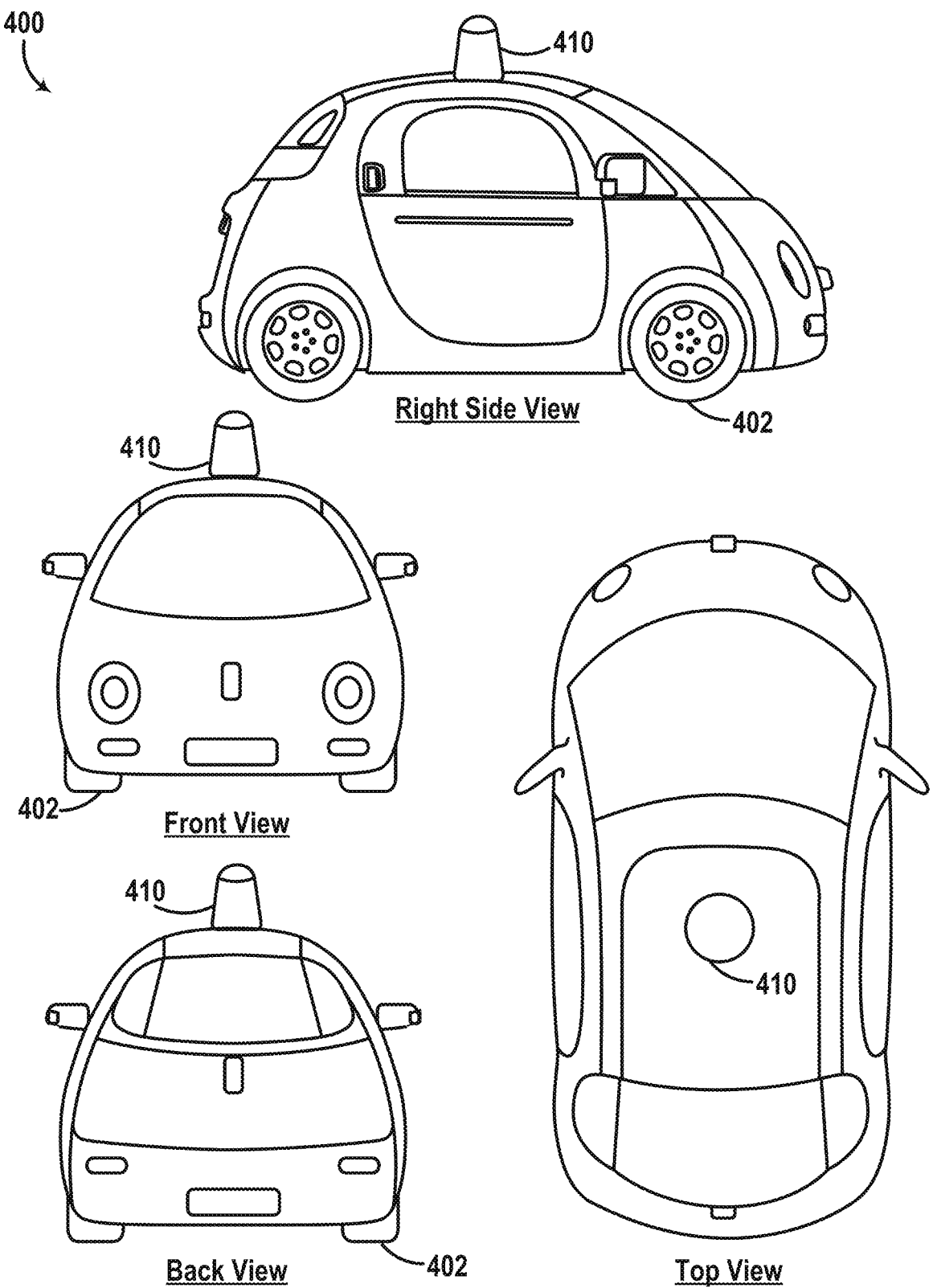
FIG. 4A illustrates several views of a vehicle equipped with a LIDAR device, according to an example embodiment.

FIG. 4A shows a Right Side View, Front View, Back View, and Top View of vehicle 400. As shown, vehicle 400 includes a LIDAR device 410 mounted on a top side of vehicle 400 opposite a bottom side on which wheels of vehicle 400, exemplified by wheel 402, are located. LIDAR device 410 may be similar to LIDAR devices 100 and/or 200, for example. Although LIDAR device 410 is shown and described as being positioned on a top side of vehicle 400, LIDAR device 410 could be alternatively positioned on any other part of vehicle 400, including any other side of vehicle 400 for instance.

Figure 4B:
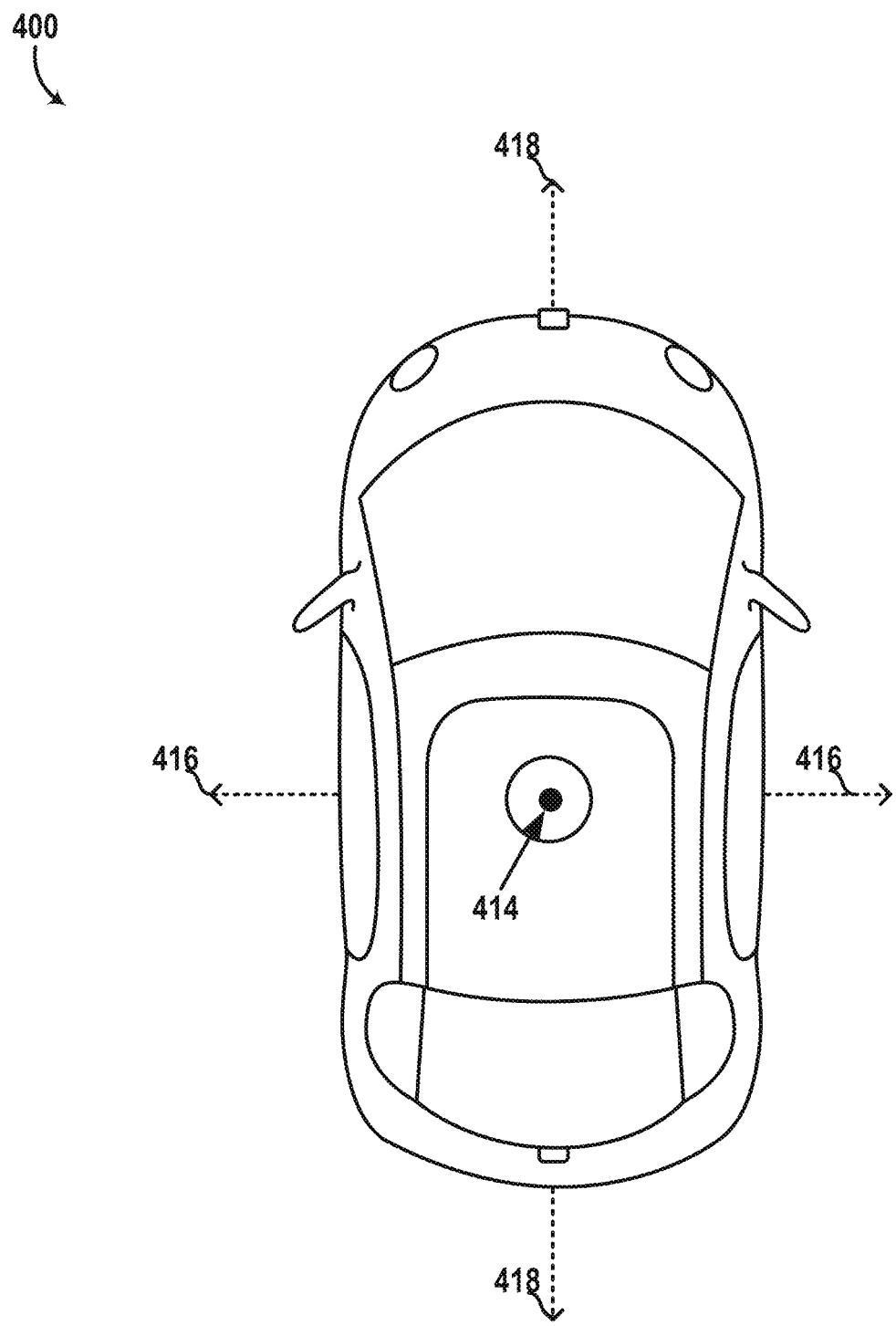
FIG. 4B illustrates a top view of the vehicle.

FIG. 4B illustrates another top view of vehicle 400. In some scenarios, vehicle 400 may rotate about one or more axes, which are shown as yaw axis 414, pitch axis 416, and roll axis 418. Yaw axis 414 may correspond to a height-wise axis extending through the top of the vehicle (and out of the page). In an example scenario, a yaw rotation of vehicle 400 about yaw axis 414 may correspond to adjusting an orientation of vehicle 400 in the environment (e.g., a pointing or heading direction of a vehicle traveling along a driving surface, etc.).

Pitch axis 416 may correspond to a rotational axis that extends widthwise through the right side and left side of vehicle 400. In an example scenario, a pitch rotation of vehicle 400 about pitch axis 416 may result from an acceleration or deceleration (e.g., application of brakes, etc.) of vehicle 400. For instance, a deceleration of the vehicle may cause the vehicle to tilt toward the front side of the vehicle (i.e., pitch rotation about pitch axis 416). In this scenario, front wheel shocks (not shown) of 400 may compress to absorb the force due to the change of momentum of the vehicle, and back wheel shocks (not shown) may expand to allow the vehicle to tilt toward the front side. In another example scenario, a pitch rotation of vehicle 400 about pitch axis 416 may result from vehicle 400 traveling along a sloped driving surface (e.g., hill, etc.), thereby causing vehicle 400 to tilt upwards or downwards (i.e., pitch-wise) depending on the slope of the driving surface.

Roll axis 418 may correspond to a rotational axis that extends lengthwise through the front side and the back side of vehicle 400. In an example scenario, a roll rotation of vehicle 400 about roll axis 418 may occur in response to the vehicle performing a turning maneuver. For instance, if the vehicle performs a sudden right turn maneuver, the vehicle may bank toward the left side (i.e., roll rotation about roll axis 418) in response to a force caused by the changing momentum of the vehicle or a centripetal force acting on the vehicle due to the maneuver, etc. In another example scenario, a roll rotation of vehicle 400 about roll axis 418 may occur as a result of vehicle 400 traveling along a curved driving surface (e.g., road camber, etc.), which may cause vehicle 400 to tilt sideways (i.e., roll-wise) depending on the curvature of the driving surface. Other scenarios are possible as well.

It is noted that the positions of the various rotational axes 414, 416, 418 may vary depending on various physical characteristics of vehicle 400, such as the location of a center of gravity of the vehicle, locations and/or mounting positions of wheels of the vehicle, etc. To that end, the various axes 414, 416, 418 are illustrated as shown only for the sake of example. Thus, for instance, roll axis 418 can be alternatively positioned to have a different path through the front side and back side of vehicle 400, and yaw axis 414 may extend through a different region of the top side of vehicle 400 than that shown, etc.

Figure 4C:
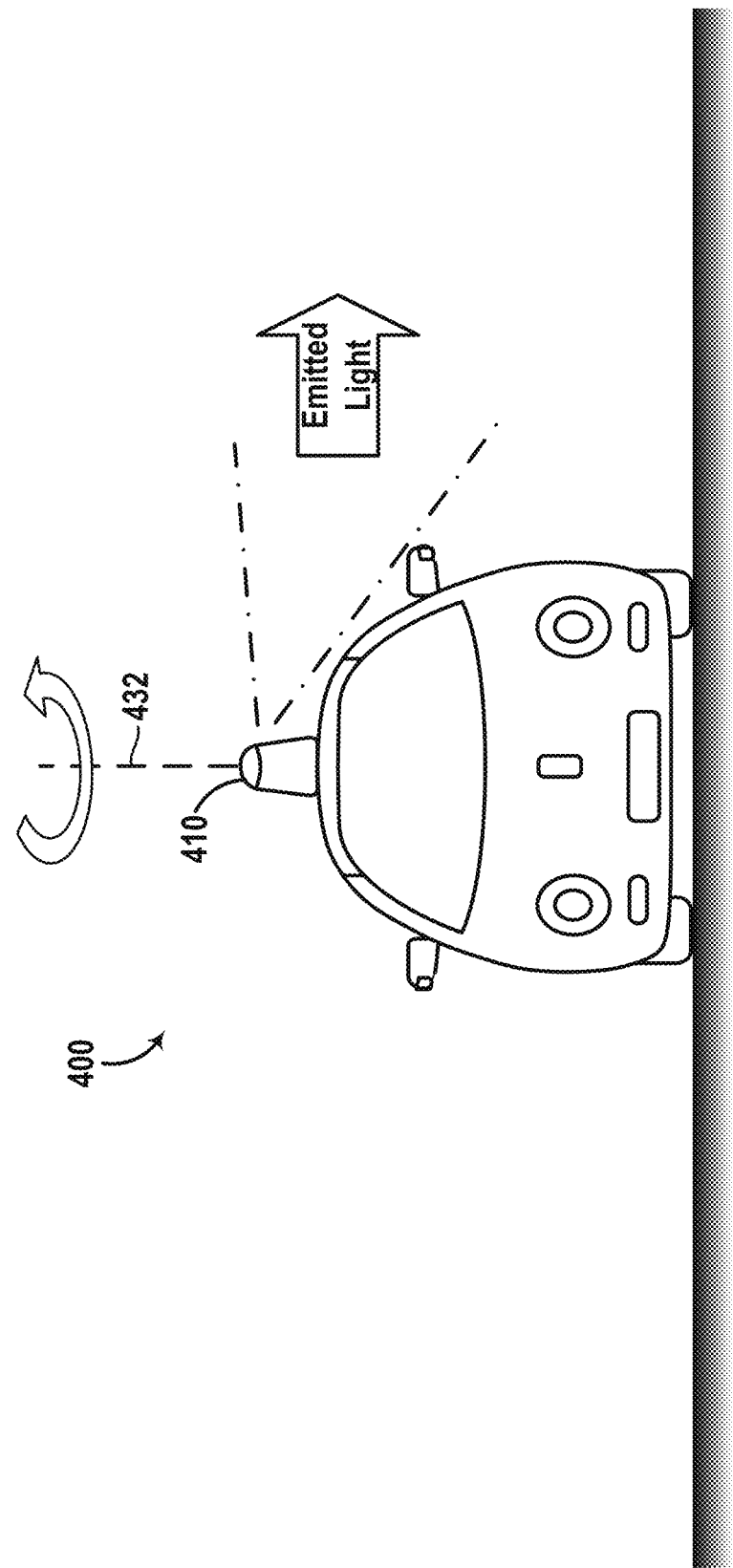
FIG. 4C illustrates an example operation of the LIDAR device.

FIG. 4C shows that LIDAR device 410 may be configured to scan an environment around vehicle 400 by rotating about vertical axis 432, while emitting light pulses and detecting reflected light pulses off objects in the environment, for example.

Thus, as shown, LIDAR device 410 may emit light in a pointing direction of LIDAR 410, which is shown as a pointing direction toward a right side of the page for example. With this arrangement, LIDAR device 410 can emit light toward regions of the environment that are relatively close to the vehicle (e.g., a lane marker) as well as toward regions of the environment that are further away from the vehicle (e.g., a road sign ahead of the vehicle). Further, vehicle 400 can rotate LIDAR device 410 (or one or more components thereof) about axis 432 to change the pointing direction of LIDAR device 410. In one example, vehicle 400 may rotate LIDAR device 410 about axis 432 repeatedly for complete rotations. In this example, for each complete rotation of LIDAR device 410 (or one or more components thereof), LIDAR device 410 can scan a 360° FOV around vehicle 400. In another example, vehicle 400 may rotate LIDAR device 410 about axis 432 for less than a complete rotation (e.g., to scan a limited horizontal FOV rather than a complete 360° FOV).

Figure 4D:
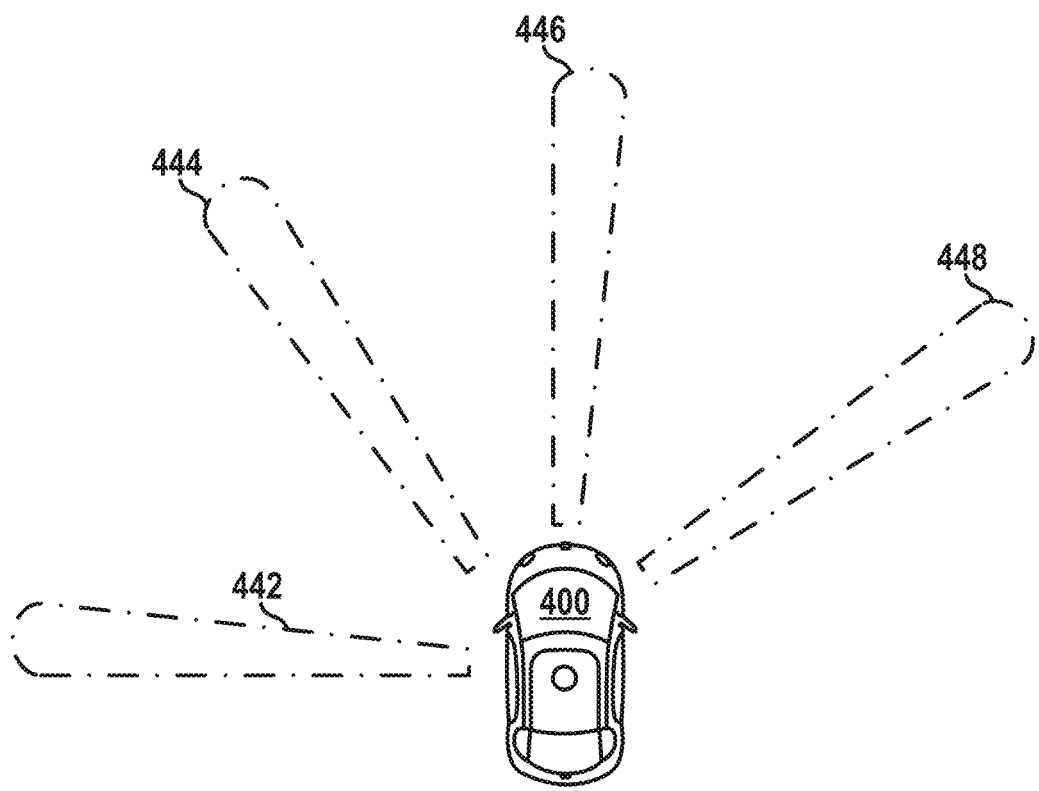
FIG. 4D illustrates another example operation of the LIDAR device.

FIG. 4D is an illustration of vehicle 400 scanning the surrounding environment using LIDAR device 410, according to an example embodiment. As shown, each of contours 442, 444, 446, and 448 may correspond to respective FOVs that are scanned when LIDAR device 410 is directed in the corresponding pointing directions. By way of example, contour 442 may correspond to a region of the environment scanned by LIDAR device 410 when LIDAR device 410 is in a first pointing direction toward the left side of the page. For instance, objects inside of contour 442 may be within a range of distances suitable for proper detection and/or identification using data from LIDAR device 410 while positioned in the first pointing direction. Further, in this example, when LIDAR device 410 is rotated to a second pointing direction toward the top of the page, LIDAR device 410 can then scan the region of the environment indicated by contour 446. It is noted that these contours are not necessarily to scale and not intended to represent actual contours of a LIDAR FOV, but instead are illustrated as shown for convenience of description.

In some examples, LIDAR 410 may be configured to rotate repeatedly about axis 432 at a given frequency (f). For instance, in an example scenario where f=15 Hz, LIDAR 410 may have the first pointing direction (associated with contour 442) fifteen times every second, i.e., after every given period (T=1/f) of time from a previous time when LIDAR 410 was at the first pointing direction. Thus, in this scenario, at time t=0, LIDAR 410 may be at the first pointing direction associated with contour 442. Further, in this scenario, at time t=T/4, LIDAR device 410 may be at the second pointing direction associated with contour 446 (e.g., one quarter of a complete rotation about axis 432, etc.).

As a variation of the scenario above, LIDAR 410 may alternatively be at a third pointing direction associated with contour 444 at time t=0. In this scenario, at time t=T/4, LIDAR 410 may thus be at a fourth pointing direction associated with contour 448 instead of the second pointing direction associated with contour 446. Thus, in this scenario, the phase of the rotation of LIDAR 410 about axis 432 may differ from the phase of the rotation in the previous scenario. The difference between the two phases may be due to various reasons. For example, the initial position (e.g., at time t=0) may depend on various factors such as when the LIDAR 410 begins rotating about axis 432 (e.g., the time at which vehicle 400 provides power to LIDAR device 410, etc.). Other factors are possible as well.

Figure 5:
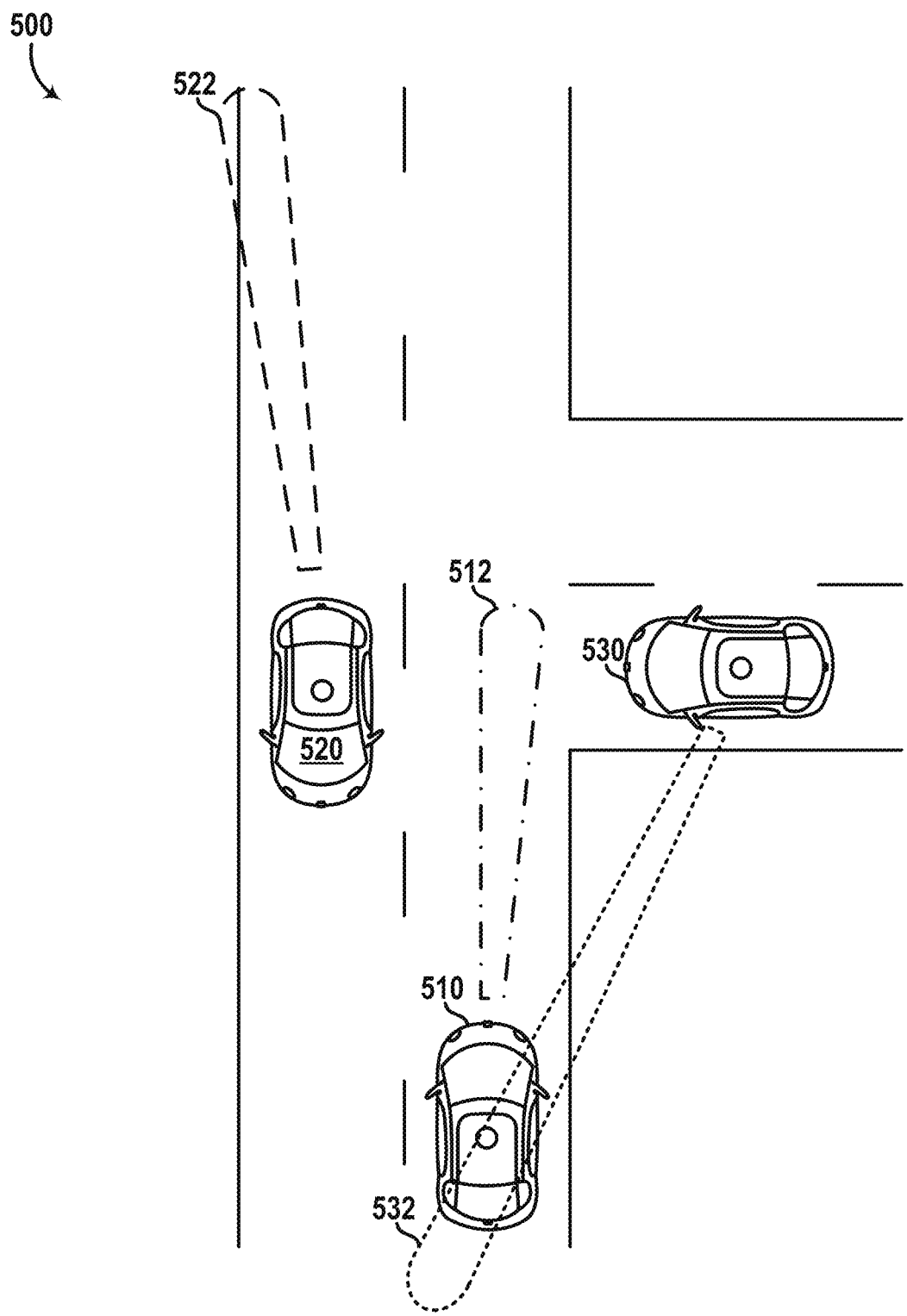
FIG. 5 illustrates multiple vehicles operating in an environment, according to an example embodiment.

FIG. 5 illustrates multiple vehicles 510, 520, and 530 operating in an environment 500, according to example embodiments. For example, each of vehicles 510, 520, and 530 may be similar to vehicles 300 and/or 400. Thus, contours 512, 522, 532 (e.g., similar to any of contours 442, 444, 446, 448) may correspond to respective FOVs scanned by respective vehicle-mounted LIDARs (e.g., LIDAR 410, etc.) of vehicles 510, 520, 530 at a particular time. As shown, for instance, FOV 512 is associated with a first LIDAR pointing direction of a LIDAR device mounted on vehicle 510, FOV 522 is associated with a second LIDAR pointing direction of a LIDAR device mounted on vehicle 520, and FOV 532 is associated with a third LIDAR pointing direction of a LIDAR device mounted on vehicle 530.

As noted above, in some scenarios, motion of vehicles 510, 520, and/or 530 may affect the operations of the respective LIDARs mounted thereon.

In a first scenario, the LIDAR of vehicle 530 may be rotating in a clockwise direction about an axis (e.g., similar to axis 432) extending out of the page at a particular frequency (f1) relative to vehicle 530. If vehicle 530 is stationary, then the LIDAR may be rotating at the same frequency (f1) relative to environment 500 as well. However, if vehicle 530 is performing a turning maneuver, then the frequency of rotation of the LIDAR relative to the environment may be different than rotation frequency (f1) of the LIDAR relative to the vehicle. For example, if vehicle 530 performs a left turn maneuver, then the yaw direction of the vehicle in the environment may change in the counter-clockwise direction about a yaw axis of the vehicle (e.g., axis that extends vertically similarly to the axis of rotation of the LIDAR). The change to the yaw direction may correspond to a rotation of the vehicle about the yaw axis at a particular frequency (f2) relative to the environment. Because the vehicle is rotating in a (counterclockwise) direction opposite to the (clockwise) direction of the rotation of the LIDAR, the frequency of rotation of the LIDAR relative to environment 500 may be reduced (e.g., equal to f1-f2) while vehicle 510 is performing the turning maneuver. As a result, the LIDAR may scan environment 500 at a higher resolution during the turning maneuver than if the vehicle was instead not turning.

For instance, in this scenario, the LIDAR rotation frequency (f1) may be 10 Hz and the vehicle rotation frequency (f2) may be 1 Hz. Additionally, for instance, vehicle 530 may perform the turning maneuver during a particular period of time (e.g., t=0.25 sec), and the LIDAR may emit light pulses at a particular pulse rate (e.g., y=10,000 pulses/sec). Thus, in this scenario, the LIDAR may scan a 360-degree field-of-view (FOV) of the environment 2.25 times (e.g., x1=(f1−f2)*t=(10−1)*0.25=2.25), and with a scanning resolution of y*t/x1=10,000*0.25/2.25=1,111 LIDAR data points per scan of the 360-degree FOV. Whereas, if vehicle 530 was not turning (e.g., f2=0), the LIDAR would instead scan the same 360-degree FOV 2.5 times (e.g., x2=(f1−f2)*t=(10−0)*0.25=2.5), and with a lower scanning resolution of y*t/x2=10,000*0.25/2.5=1,000 LIDAR data points per scan of the 360-degree FOV.

It is noted that the various parameters (e.g., f1, f2, t, x1, x2, y, etc.) described in this scenario are only for the sake of example. For example, the LIDAR could be operated according to various different rotation frequencies, light pulse emission rates, etc.

In a second scenario, the LIDAR of vehicle 510 may be configured to rotate in a clockwise direction. In this scenario, vehicle 510 may detect vehicle 530 when the LIDAR of vehicle 510 is within a range of pointing directions that cause contour 512 to overlap a given region of environment 500 where vehicle 530 is located. Further, in this scenario, vehicle 510 may be moving in a first direction (e.g., toward the top of the page along a y-axis, or positive y-direction). In this scenario, from a perspective of the LIDAR of vehicle 510, an object in environment 500 (e.g., vehicle 530) is moving in an opposite direction (e.g., negative y-direction) relative to the LIDAR of vehicle 510. Because of the apparent motion of vehicle 530 from the perspective of the LIDAR of vehicle 510, vehicle 530 may remain within the FOV of the LIDAR of vehicle 510 for a relatively longer period of time during the clockwise rotation of the LIDAR. Whereas, if the LIDAR of vehicle 510 was instead scanning vehicle 530 while vehicle 510 is stationary, then vehicle 530 may remain within the FOV of the LIDAR for a relatively shorter period of time during the clockwise rotation of the LIDAR. Thus, the LIDAR of vehicle 510 may scan vehicle 530 at a higher scanning resolution when vehicle 510 is moving in the positive y-direction than when vehicle 510 is stationary. Other scenarios are possible.

Accordingly, in some examples, pointing directions of a sensor relative to a vehicle can be adjusted to mitigate or reduce scanning resolution variations associated with the motion of the vehicle. In the first scenario above for instance, vehicle 530 can be configured to increase the frequency of rotation of the LIDAR mounted thereon during the turning maneuver to account for the motion of vehicle 530. Further, in the second scenario for instance, vehicle 510 can be configured to adjust the frequency of rotation of its LIDAR based on measurements of the direction and/or speed of the motion of vehicle 510.

IV. EXAMPLE SENSOR ADJUSTMENT IMPLEMENTATIONS

Figure 6:
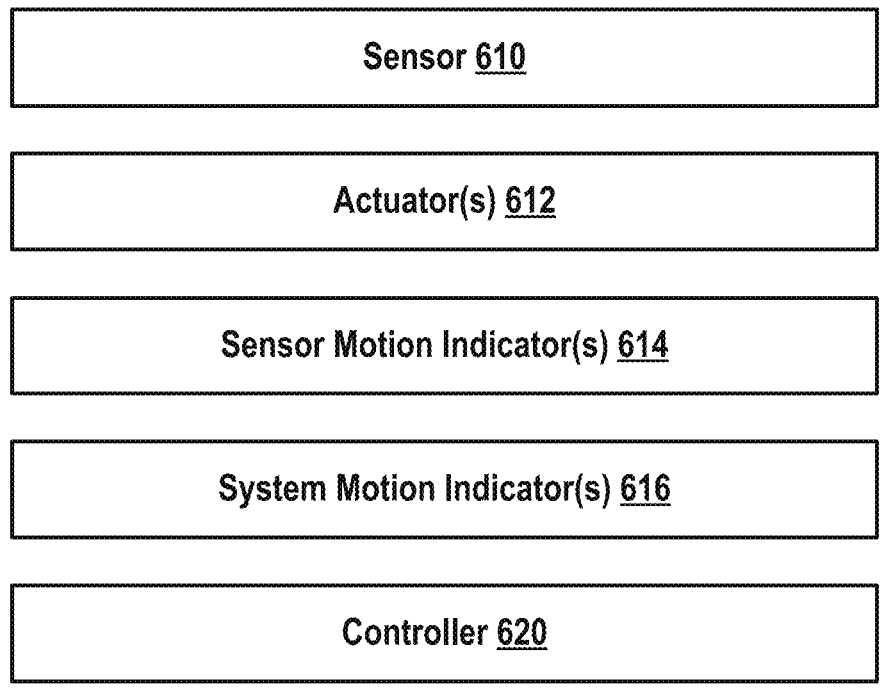
FIG. 6 is a simplified block diagram of a system, according to an example embodiment.

FIG. 6 is a simplified block diagram of a system 600 for adjusting vehicle-mounted sensors, according to example embodiments. System 600 illustrates an example system that facilitates the sensor adjustment operations, in accordance with the present disclosure. To that end, in some examples, system 600 and/or one or more components thereof can be used with and/or incorporated within a vehicle, such as any of vehicles 300, 400, 510, 520, 530. Alternatively or additionally, in some examples, system 600 and/or one or more components thereof can be used with and/or incorporated within various types of systems, such as robotic devices, remote sensing platforms, among other examples. As shown, system 600 includes a sensor 610, one or more actuators 612, one or more sensor motion indicators 614, one or more system motion indicators 616, and a controller 620.

Sensor 610 may be similar to any of LIDARs 100, 200, 332, 410, or any other device that emits a signal and detects reflections of the emitted signal to scan a field-of-view (FOV) defined by a pointing direction of the device. To that end, although not shown, sensor 610 may include other types of sensors in addition to or instead of a LIDAR. For example, sensor 610 may be or may include a RADAR sensor (e.g., RADAR unit 330), a SONAR sensor, a camera (e.g., camera 334, an active camera that emits light to illuminate a scene and captures an image of the illuminated scene, active IR camera, passive camera, etc.), or any other active or passive sensor. Further, in some implementations, sensor 610 can be mounted to any side of a vehicle (e.g., top, right, left, back, etc.), such as any of vehicles 300, 400 for instance.

Actuator(s) 612 may comprise one or more actuators (e.g., motors, etc.) similar to actuator(s) 336. In one implementation, actuator 612 may be configured to rotate sensor 610 (or a rotating platform on which the sensor is mounted, such as any of rotating platforms 116, 226 for instance) about an axis (e.g., axis 432, etc.). Further, in some implementations, actuator 612 can rotate sensor 610 complete rotations about the axis, or partial rotations about the axis.

Alternatively or additionally, system 600 may be configured to adjust the pointing direction of signals emitted by sensor 610 (e.g., emitted by transmitter 106 or other transmitter of sensor 610) in various ways. In one implementation, signal sources (e.g., light sources, antennas, acoustic transducers, etc.) of sensor 610 can be operated according to a phased array configuration or other type of beam steering configuration.

In a first example, where sensor 610 is configured as a LIDAR device, light sources in the LIDAR device (e.g., in transmitter 106, etc.) can be coupled to phased array optics that control the phase of light waves emitted by the light sources. For instance, controller 620 can be configured to adjust the phased array optics (e.g., phased array beam steering) to change the effective pointing direction of a light signal emitted by the LIDAR device (e.g., even if the LIDAR device is not rotating).

In a second example, where sensor 610 is configured as a RADAR device, a transmitter of the RADAR device may include an array of antennas, and controller 620 can provide respective phase-shifted control signals for each individual antenna in the array to modify a pointing direction of a combined RF signal from the array (e.g., phased array beam steering).

In a third example, where sensor 610 is configured as a SONAR device, a transmitter of the SONAR device may include an array of acoustic transducers, and controller 104 can similarly operate the array of acoustic transducers (e.g., via phase-shifted control signals, phased array beam steering, etc.) to achieve a target pointing direction of a combined sound signal emitted by the array (e.g., even if the rotating platform 116 is not rotating, etc.). Other examples are possible.

Sensor motion indicator(s) 614 may comprise any combination of devices and/or sensors that provide an indication of the pointing direction of sensor 610 relative to system 600 and/or a vehicle on which sensor 610 is mounted. In one example, indicator(s) 614 may comprise an encoder (e.g., mechanical encoder, optical encoder, magnetic encoder, capacitive encoder, etc.) that measures a position of sensor 610 about an axis of rotation of sensor 610 (e.g., axis 432, etc.). For instance, where sensor 610 is a LIDAR that rotates about an axis, an encoder can provide an encoder value indicating an amount of rotation of the LIDAR from an initial (or reference) position about the axis. In another example, indicators 614 may comprise any combination of devices (e.g., compass, gyroscope, accelerometer, IMU 328, etc.) that indicate a motion or direction or orientation of sensor 610 relative to system 600 (e.g., frequency of rotation, tilting position relative to the vehicle, translational motion relative to the vehicle, etc.).

To that end, in one implementation, indicators 614 may include a direction sensor or other device that indicates a measurement of the pointing direction of sensor 610 (e.g., absolute or incremental position relative to a reference pointing direction) relative to a vehicle on which sensor 610 is mounted. In another implementation, indicators 614 may include a sensor (e.g., gyroscope, accelerometer, IMU, etc.) or other device that indicates a measurement of a rate of change to the pointing direction of sensor 610 relative to a vehicle in which sensor 610 is mounted. In yet another implementation, indicators 614 may include a sensor (e.g., accelerometer, computer vision system, etc.) or other device that indicates a measurement of a position of sensor 610 relative to a vehicle to which sensor 610 is mounted. For example, indicator 614 can measure a tilting angle of sensor 610 relative to the vehicle. As another example, sensor 610 can be mounted on a moveable platform (e.g., robotic arm, etc.) that can move sensor 610 upwards, downwards, sideways, or in any other direction relative to the vehicle on which sensor 610 is mounted, and indicator 614 can thus measure the position of sensor 610 relative to the vehicle. Other examples are possible.

System motion indicator(s) 616 may comprise any combination of devices and/or sensors that provide an indication of motion of system 600 relative to a surrounding environment. For example, indicators 616 may include a direction sensor, such as a gyroscope or compass for instance, that is mounted to a vehicle and aligned with a directional axis of the vehicle (e.g., axis 414, 416, 418, etc. shown in FIG. 4B). In this example, the direction sensor may provide an indication of an orientation of the vehicle relative to the environment thereof. For instance, a gyroscope sensor may provide an output signal that indicates a rate of change to a pointing or heading direction of the vehicle (e.g., yaw direction, pitch direction, roll direction, etc.) relative to the environment in response to motion of the vehicle.

Alternatively or additionally, in some examples, indicator(s) 616 can provide an indication of a change to the orientation of a vehicle relative to the environment responsive to various vehicle movements (e.g., moving forward, moving in reverse, turning, etc.). For instance, indicators 616 may comprise a "yaw sensor" that indicates a measurement of a yaw direction of system 600 (e.g., orientation of a vehicle relative to a geographic north, etc.), and/or a "yaw rate sensor" that indicates a measurement of a yaw rate of change to a yaw direction of system 600 (and/or a vehicle that includes system 600) in the environment. Similarly, in some instances, indicators 616 may include sensors configured as "pitch sensors," "pitch rate sensors," "roll sensors," and/or "roll rate sensors."

Additionally or alternatively, in some examples, indicators 616 may include speed sensors that provide an indication of a speed of the motion of system 600 (and/or a vehicle that includes system 600, etc.) relative to the surrounding environment. For example, indicators 616 may include any combination of sensors, such as a speedometer (e.g., sensor that measures rate of rotation of wheels 324, etc.), a satellite navigation sensor (e.g., GPS 326 that provides data indicating a speed of motion of vehicle 300), an inertial measurement unit (e.g., IMU 328), an accelerometer, a gyroscope, among other possibilities.

Controller 620 may comprise one or more general-purpose or special-purpose controllers that operate the various components of system 600 in accordance with the present disclosure. In one implementation, controller 620 may comprise one or more processors and data storage storing instructions executable by the one or more processors to cause system 600 (and/or one or more components thereof) to perform the various functions described herein. For example, controller 620 can be configured similarly to and/or integrated within computer system 310 of vehicle 300. Alternatively or additionally, in some implementations, controller 620 may include analog and/or digital circuitry wired to perform the various functions described herein.

In some instances, controller 620 can be implemented as multiple controllers that each perform particular functions. For instance, controller 620 may comprise a microcontroller that operates actuator(s) 612 to adjust the pointing direction of sensor 610 and/or one or more rotation characteristics (e.g., rotation phase, rotation frequency, rotation direction, etc.) of sensor 610. Further, for instance, controller 620 may comprise a vehicle controller that operates other components of system 600 (e.g., indicators 614, 616, etc.), and/or facilitates communication between a LIDAR controller (or other controller that adjusts a pointing direction of sensor 610) and other components of a vehicle (e.g., satellite navigation sensor, communication interface, other components of vehicle 300, etc.).

Thus, in some implementations, controller 620 may comprise a special-purpose controller (e.g., PID controller) that modulates power provided to actuator(s) 612 to adjust the pointing direction of sensor 610, the one or more rotation characteristics thereof, etc.

It is noted that the various functional blocks illustrated in FIG. 6 can be re-arranged or physically implemented in different combinations than those shown. Thus, in some examples, the one or more of the components of system 600 can be physically implemented within a single or several devices.

In a first example, although not shown, sensor 610 can alternatively include one or more of actuator(s) 612, indicator(s) 614, and/or controller 620. For instance, actuator(s) 612, indicator(s) 614, and/or controller 620 can be implemented within a stationary portion (e.g., stationary platform 120) and/or a rotating portion (e.g., rotating platform 116) of a LIDAR (e.g., LIDAR 100, etc.) or other type of sensor. Thus, in this example, controller 620 can receive information about an orientation or motion of system 600 (and/or a vehicle on which sensor 610 is mounted) from indicators 616, and then adjust the pointing direction of sensor 610 based on data from indicators 616.

In a second example, some or all of the functions described for the controller 620 can be implemented by an external system (e.g., remote server, etc.). For instance, a remote server can receive the various information collected using indicators 614 and/or 616. In this instance, the remote server can then determine a target pointing direction or a target rate of change to the pointing direction of sensor 610, and transmit an indication thereof for use by a vehicle that mounts sensor 610. Other examples are possible.

Further, it is noted that system 600 may include additional or fewer components than those shown, such as any of the components of LIDARs 100, 200, and/or vehicles 300, 400, among other possibilities.

Figure 7:
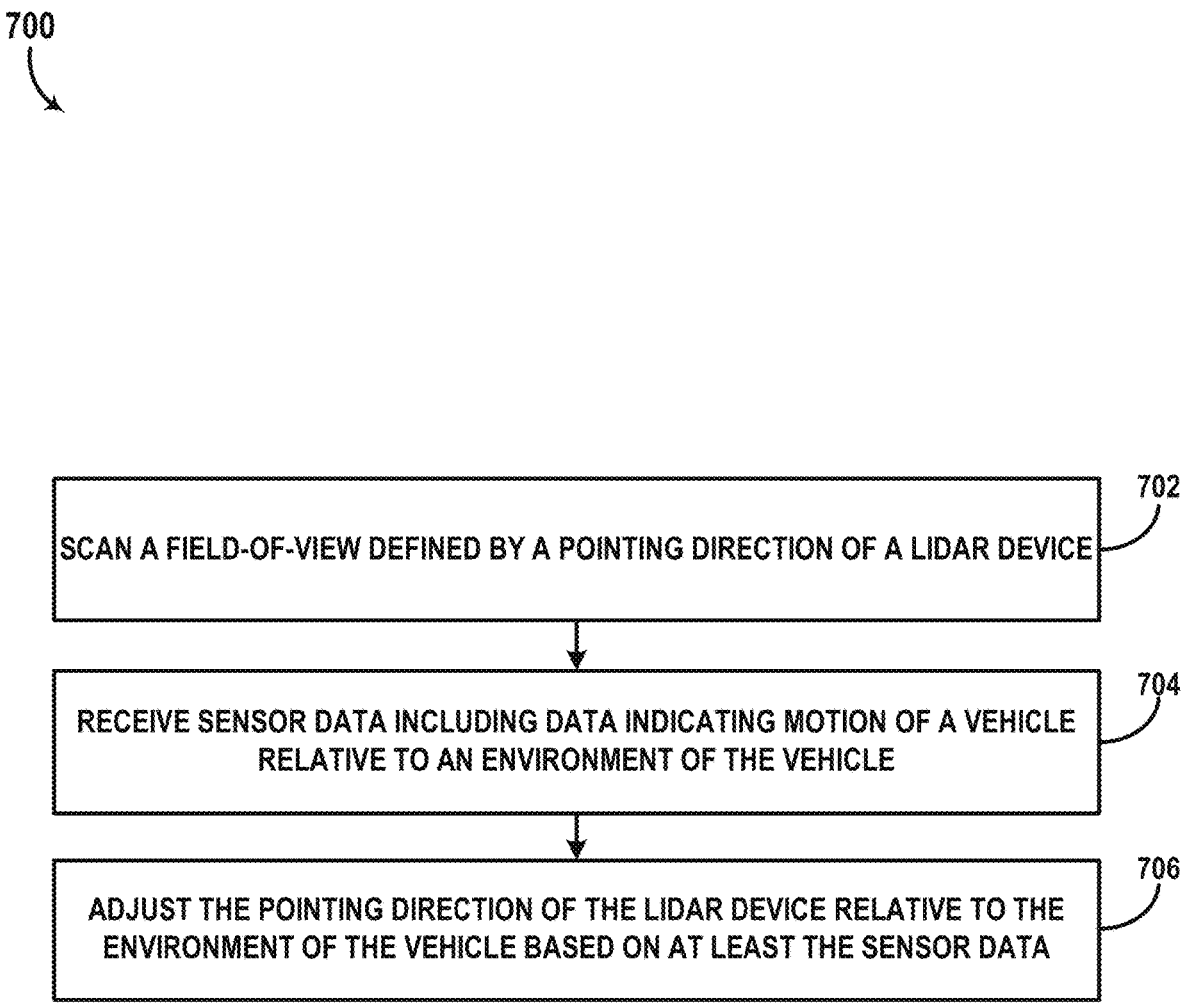
FIG. 7 is a flowchart of a method, according to an example embodiment.

FIG. 7 is a flowchart of a method 700, according to example embodiments. Method 700 presents an embodiment of a method that could be used with any of LIDAR devices 100, 200, 410, 610, vehicles 300, 400, 510, 520, 530, and/or system 600 for example. Method 700 may include one or more operations, functions, or actions as illustrated by one or more of blocks 702-706. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 700 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for method 700 and other processes and methods disclosed herein, each block in FIG. 7 may represent circuitry that is wired to perform the specific logical functions in the process.

In some examples, the functions of method 700 can be implemented using controller 104, computer system 310, control system 306, and/or controller 620. Further, in some examples, the various functions of method 700 can be implemented by a combination of one or more of these components. For example, the various functions of method 700 can be distributed between controller 104 and computer system 310, among other possibilities.

At block 702, method 700 involves scanning a field-of-view (FOV) defined by a pointing direction of a LIDAR device or other sensor. Referring back to FIG. 4D by way of example, the scanned FOV may correspond to a region of an environment within contour 442 when the LIDAR device is at a first pointing direction and to the region within contour 444 when the LIDAR device is at a second pointing direction, etc.

In some implementations, method 700 may involve rotating a sensor that emits signals and detects reflections of the emitted signals based on a pointing direction of the sensor (e.g., the LIDAR device, a RADAR sensor, a SONAR sensor, etc.). Rotating the sensor, for example, may change the pointing direction of the sensor such that the sensor scans a region of an environment from which the emitted signals are reflected. Thus, in some implementations, the LIDAR device can be configured to rotate about an axis. In one implementation, the LIDAR device can be configured to rotate for complete rotations to scan a combined 360° FOV around the LIDAR. In another implementation, the LIDAR device can be configured to rotate within a range of pointing directions (e.g., sweep back and forth between two pointing directions). Referring back to FIG. 4D for instance, the LIDAR device can be configured to scan FOVs between contours 444 and 448, etc.

Additionally or alternatively, in some examples, method 700 may involve using a different type of sensor (e.g., RADAR unit 332, camera 334, SONAR sensor, etc.) that emits and/or detects other types of signals (e.g., radio waves, light waves of different wavelengths, sound waves, etc.).

At block 704, method 700 involves receiving sensor data including data indicating motion of a vehicle relative to an environment of the vehicle. In some examples, the sensor data may include data obtained using one or more sensors such as sensors 616 and/or sensors in sensor system 304.

In a first example, the one or more sensors may include a sensor or other device (e.g., indicator 616) that provides an indication of a speed of the motion of the vehicle relative to the environment, such as a speedometer, a GPS, etc.

In a second example, the one or more sensors may include a sensor or other device that indicates a measurement of an orientation of the vehicle relative to an environment of the vehicle (or a measurement of a rate of change to the orientation and/or the direction of the motion of the vehicle). For instance, the one or more sensors may include a gyroscope, accelerometer, compass, etc., mounted to the vehicle and configured to measure the yaw, pitch, and/or roll direction of the vehicle (and/or a rate of change to such direction/orientation) relative to Earth. Referring back to FIG. 4B for instance, vehicle 400 may include a sensor (e.g., gyroscope, etc.) aligned with axis 414, 416, or 418. Thus, vehicle 400 can obtain data from such sensor indicating an orientation of vehicle 400 relative to an environment of vehicle 400.

In some implementations, method 700 may involve determining a yaw rate of change to a yaw direction of a vehicle that mounts the LIDAR device. For example, a vehicle of system 600 may obtain a measurement of the yaw direction (or yaw rate) using indicator(s) 616. Further, in some examples, the yaw direction or yaw rate can be determined based on a combination of vehicle orientation sensors. For example, if the vehicle is performing a turning maneuver or moving along a banked surface, the vehicle may temporarily have a pitch/roll offset relative to the environment. In turn, the measurements by a "yaw sensor" aligned with axis 414 of vehicle 400 may be biased due to the pitch/roll orientation of the vehicle during the turning maneuver or while driving on the banked surface. Accordingly, in this example, a yaw direction (or yaw rate) of the vehicle (relative to the environment) can be determined based on a combination of outputs from a yaw sensor (e.g., gyroscope aligned with axis 414), a pitch sensor (e.g., aligned with axis 416), and/or a roll sensor (e.g., aligned with axis 418), etc.

In some examples, the sensor data received at block 704 may include data from one or more devices or sensors that indicate measurements related to motion of the LIDAR device relative to the vehicle, such as any of indicators 614 for instance. In one example, the one or more devices may include a sensor that indicates a measurement of the pointing direction of the LIDAR device, such as an encoder, a camera, or other type of sensor. For instance, where the LIDAR device rotates about an axis, the sensor (e.g., encoder, etc.) may indicate a measurement of a position of the LIDAR device about the axis. In another example, the one or more sensors may include a sensor that indicates a measurement of a rate of change to the pointing direction of the LIDAR device (e.g., gyroscope, accelerometer, etc.). For instance, where the LIDAR device rotates about an axis, the sensor may indicate a measurement of a frequency of rotation of the LIDAR device about the axis.

At block 706, method 700 involves adjusting the pointing direction of the LIDAR device (or other sensor) based on at least the received sensor data. As noted above, in some implementations, the LIDAR device may be configured to rotate about an axis. Accordingly, in these implementations, the adjustment at block 706 may involve adjusting one or more characteristics (e.g., frequency, phase, direction, etc.) of the rotation of the LIDAR device about the axis.

In some examples, the adjustment of the pointing direction at block 706 may involve operating an actuator (e.g., actuator 612) to rotate the LIDAR device about the axis. Alternatively or additionally, in some examples, the adjustment of the pointing direction at block 706 may involve modifying a modulation pattern of signals emitted by the LIDAR device (or other active sensor). For example, a system of method 700 may employ various types of beam steering configurations (e.g., phased array beam steering, etc.) to adjust the pointing direction of signals emitted by the LIDAR device (or other sensor) toward the environment. For instance, the LIDAR device (or a RADAR, SONAR, camera, etc.) may include an array of emitters or an array of optical elements that adjust directions of individual signals emitted by the LIDAR device, such that a combination of the individual signals (e.g., via constructive or destructive interference, etc.) together provide a signal that has a particular pointing direction in the environment.

As noted above, the sensor data received at block 704 may include data from a device (e.g., encoder, gyroscope, accelerometer, or other sensor) that indicates measurements of a motion of the LIDAR device relative to the vehicle (e.g., frequency of rotation of the LIDAR device about an axis, etc.). Accordingly, in some implementations, method 700 may involve adjusting the pointing direction of the LIDAR device at block 706 further based on the motion of the LIDAR device (relative to the vehicle) indicated by the measurements from the device.

In some implementations, method 700 may involve determining a target rate of change to the pointing direction of the LIDAR device (or other type of sensor). For example, in implementations where the LIDAR device does not rotate (e.g., spin) repeatedly for complete rotations about an axis but rather scans across one or more predefined ranges of pointing directions, the system may determine a target rate of change to the pointing direction within the predefined one or more ranges.

In some implementations, method 700 may involve determining a target frequency of rotation of the LIDAR device about the axis. In one example, a remote server may instruct vehicles 300, 400, etc. to use a nominal rotation frequency rate (e.g., 15 Hz, 10 Hz) etc.) for their respective LIDARs. In another example, vehicles 300 and/or 400 may include data storage that stores an indication of the target frequency of rotation.

In some implementations, method 700 may also involve determining an adjusted target rate of change to the pointing direction (or an adjusted target frequency of rotation) of the LIDAR device based on a measured yaw direction (and/or yaw rate) of the vehicle on which the LIDAR device is mounted.

Referring back to FIG. 5 for example, if vehicle 530 is performing a right turn maneuver and the LIDAR device thereon has a nominal target frequency of rotation (e.g., 15 Hz) in the clockwise direction relative to vehicle 530, then a system of method 700 may reduce the adjusted target frequency of rotation while vehicle 530 is performing the turning maneuver. On the other hand, if the nominal target frequency of rotation is in the counterclockwise direction relative to vehicle 530 (or vehicle 530 is performing a left turn maneuver), then the system may increase the adjusted target frequency of rotation while vehicle 530 is performing the turning maneuver. Thus, the adjustment in this example can be represented by equation [1] below.

$$\text{adjusted\_target\_frequency} = \text{nominal\_target\_frequency} - \text{vehicle\_yaw\_rate} \qquad [1]$$

Thus, in some implementations, method 700 may also involve determining a difference between the adjusted target change to the pointing direction (or adjusted target frequency of rotation) of the LIDAR device and a measured change to the pointing direction (or measured frequency of rotation) of the LIDAR device, as shown in equation [2] below.

$$\text{frequency\_error} = \text{adjusted\_target\_frequency} - \text{measured\_frequency} \qquad [2]$$

The measured_frequency, for instance, may correspond to a measured frequency of rotation of the LIDAR device relative to the vehicle on which the LIDAR device is mounted (e.g., output of indicator(s) 614). Thus, for instance, frequency_error can map the rate of change to the pointing direction of the LIDAR device relative to the vehicle to a rate of change of the pointing direction of the LIDAR device relative to the environment. Through this process, for instance, the LIDAR device can scan a region of the environment during a turning maneuver at the same or similar scanning resolution as when the vehicle is not turning.

In some implementations, method 700 may also involve modulating power provided to an actuator that rotates the LIDAR device based on: (i) a difference between the target pointing direction and the measured pointing direction, and/or (ii) a difference between the target rate of change (or target frequency of rotation) and the measured rate of change (or measured frequency of rotation). For example, a system of method 700 may perform the computations in equation [3] below.

$$\text{motor\_drive\_signal} = \text{MotorCon}(\text{frequency\_error}) \quad [3]$$

where motor_drive_signal may be a modulated signal provided by a controller (e.g., controller 620) to power an actuator (e.g., actuator 612) according to a configuration of a motor controller (e.g. PID controller, etc.) indicated by the function MotorCon. Thus, for example, MotorCon may be any motor controller configuration (e.g., PID controller interface, etc.) that computes a voltage or current (e.g., modulated power signal, etc.) to apply to actuator 612.

It is noted that implementations described above in connection with equations [1]-[3] are exemplary only. Other implementations are possible as well without departing from the scope of the present disclosure.

Thus, in some implementations, method 700 may involve modulating power provided to an actuator that adjusts the pointing direction of the LIDAR device based on a difference between: motion of the LIDAR device (relative to the vehicle), and motion of the vehicle (relative to the environment).

As noted above, in some examples, the sensor data received at block 704 may include sensor data from a sensor that provides an indication of a speed of the motion of the vehicle (to which the LIDAR device may be mounted) relative to the environment. Accordingly, in some implementations, method 700 involves adjusting the pointing direction of the LIDAR device based on the speed of the motion indicated by the sensor. Referring back to FIG. 5 by way of example, if vehicle 510 is travelling toward the top of the page, while scanning a region of the environment that includes vehicle 530 by rotating a LIDAR of vehicle 510 to adjust contour 512 in a clockwise direction, then vehicle 530 may appear (from the viewpoint of the LIDAR of vehicle 510) to be moving toward the bottom of the page. As a result, contour 512 of the LIDAR of vehicle 510 may continue to overlap vehicle 530 for a longer period of time (i.e., a greater range of pointing directions) than if vehicle 510 was instead not moving toward the top of the page. In turn, the scanning resolution of the LIDAR of vehicle 510 (e.g., number of light pulses emitted while the LIDAR is pointing toward vehicle 530) may be higher than if vehicle 510 was not moving toward the top of the page. Thus, in this example, vehicle 510 can be configured to reduce the rate of change to the pointing direction of the LIDAR of vehicle 510 (e.g., reduce frequency of rotation of the LIDAR) to account for the motion of the vehicle toward the top of the page (at least while scanning the region of the environment where vehicle 530 is located). By doing so, for instance, variations in the LIDAR (or other sensor) scanning resolution due to forward/backward motion of the vehicle can be mitigated or reduced.

For instance, an extent to the reduction in the frequency of rotation of the LIDAR may be based on the measured speed of the motion of the vehicle. To that end, in some implementations, method 700 may involve modulating the power provided to the actuator that rotates the LIDAR device based on a measurement of the pointing direction of the LIDAR device and a measurement of an orientation or a direction of the vehicle (relative to the environment).

In some examples, alternatively or additionally to adjusting the pointing direction of the LIDAR device based on the motion (e.g., turning maneuver, forward motion, backward motion, etc.) of the vehicle, method 700 may involve adjusting a pulse emission rate of light pulses emitted by the LIDAR device. By doing so, for instance, the system may achieve an increase or reduction in the scanning resolution associated with a scanned region of the environment (e.g., due to the adjusted number of light pulses transmitted toward the scanned region). Accordingly, in some implementations, method 700 involves causing the LIDAR device to adjust a pulse emission rate of light pulses emitted by the LIDAR device based on at least the motion of the vehicle (e.g., indicated by indicators 616) and/or the measurement of the pointing direction of the LIDAR device (e.g., indicated by indicators 614).

It is noted that the various functions described above for blocks 702-706 of method 700 can be employed with other types of sensors (e.g., RADAR sensor, SONAR sensor, camera, etc.) in addition to or instead of the LIDAR device. Accordingly, in some implementations, method 700 may involve scanning a FOV defined by a pointing direction of a sensor (e.g., LIDAR, RADAR, SONAR, camera, etc.), receiving sensor data including data indicating motion of a vehicle relative to an environment of the vehicle, and adjusting the pointing direction of the sensor relative to the environment of the vehicle based on at least the sensor data.

V. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

What is claimed:

1. A system comprising:
   a light detection and ranging (LIDAR) device that scans a field-of-view (FOV) defined by a pointing direction of the LIDAR device, wherein the LIDAR device mounts to a vehicle;
   an actuator that adjusts the pointing direction of the LIDAR device;
   one or more sensors that indicate measurements related to motion of the vehicle relative to an environment of the vehicle, wherein the one or more sensors comprise at least one sensor that indicates a measurement of a rate of change to a yaw direction of the vehicle relative to the environment; and
   a controller that (i) determines a target rate of rotation of the pointing direction of the LIDAR device based on a difference between a nominal rate of rotation and the rate of change to the yaw direction of the vehicle indicated by the at least one sensor, wherein the nominal rate of rotation is a non-zero rate of rotation of the pointing direction of the LIDAR device that applies when the vehicle is stationary, and (ii) causes the actuator to adjust the pointing direction of the LIDAR device relative to the environment of the vehicle based on the target rate of rotation.

2. The system of claim 1, wherein the one or more sensors comprise a sensor that indicates a measurement of a rate of change to an orientation of the vehicle relative to the environment.

3. The system of claim 1, wherein the one or more sensors comprise a sensor that provides an indication of a speed of the vehicle relative to the environment.

4. The system of claim 1, further comprising:
one or more devices that indicate measurements related to motion of at least a portion of the LIDAR device relative to the vehicle, wherein the controller adjusts the pointing direction of the LIDAR device further based on the motion of the at least the portion of the LIDAR device indicated by the one or more devices.

5. The system of claim 4, wherein the one or more devices comprise a sensor that indicates a measurement of the pointing direction of the LIDAR device relative to the vehicle.

6. The system of claim 4, wherein the one or more devices comprise a sensor that indicates a measurement of a rate of change to the pointing direction of the LIDAR device relative to the vehicle.

7. The system of claim 4, wherein the controller modulates power provided to the actuator based on at least: a measurement of the pointing direction of the LIDAR device indicated by the one or more devices, and a measurement of an orientation of the vehicle indicated by the one or more sensors.

8. The system of claim 4, wherein the controller modulates power provided to the actuator based on at least a difference between: a measurement of a rate of change to the pointing direction of the LIDAR device indicated by the one or more devices, and a measurement of a rate of change to an orientation of the vehicle indicated by the one or more sensors.

9. The system of claim 1, wherein the LIDAR device emits light pulses, and wherein the controller further causes the LIDAR device to adjust a pulse emission rate of the emitted light pulses based on at least the motion of the vehicle indicated by the one or more sensors.

10. The system of claim 9, wherein the controller causes the LIDAR device to adjust the pulse emission rate further based on a measurement of the pointing direction of the LIDAR device.

11. A method comprising:
scanning a field-of-view defined by a pointing direction of a light detection and ranging (LIDAR) device that mounts to a vehicle;
receiving sensor data comprising data indicative of motion and orientation of the vehicle relative to an environment of the vehicle, wherein the data indicative of motion and orientation of the vehicle comprises data indicative of a rate of change to a yaw direction of the vehicle relative to the environment;
determining a target rate of rotation of the pointing direction of the LIDAR device based on a difference between a nominal rate of rotation and the rate of change to the yaw direction of the vehicle, wherein the nominal rate of rotation is a non-zero rate of rotation of the pointing direction of the LIDAR device that applies when the vehicle is stationary; and
adjusting the pointing direction of the LIDAR device relative to the environment of the vehicle based on the target rate of rotation of the pointing direction of the LIDAR device.

12. The method of claim 11, wherein the sensor data further comprises data indicative of motion of at least a portion of the LIDAR device relative to the vehicle.

13. The method of claim 12, further comprising:
modulating power provided to an actuator that adjusts the pointing direction of the LIDAR device based on at least a difference between: the motion of the at least the portion of the LIDAR device indicated by the sensor data, and the motion of the vehicle indicated by the sensor data.

14. The system of claim 1, wherein the target rate of rotation is a target frequency of rotation and wherein the nominal rate of rotation is a nominal frequency of rotation.

15. The method of claim 11, wherein the target rate of rotation is a target frequency of rotation and wherein the nominal rate of rotation is a nominal frequency of rotation.

* * * * *